(12) United States Patent
Hori et al.

(10) Patent No.: US 7,300,998 B2
(45) Date of Patent: Nov. 27, 2007

(54) POLYESTER RESIN AND CATALYST FOR POLYESTER PRODUCTION, PROCESS FOR PRODUCING POLYESTER RESIN WITH THE CATALYST, POLYESTER RESIN OBTAINED WITH THE CATALYST, AND HOLLOW MOLDED CONTAINER COMPRISING THE POLYESTER RESINS

(75) Inventors: Hideshi Hori, Yamaguchi (JP); Fujito Ehara, Yamaguchi (JP); Shouji Hiraoka, Yamaguchi (JP); Ken Maeda, Sodegaura (JP); Tomohiro Suzuki, Yamaguchi (JP); Nobumasa Mukai, Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/504,529

(22) PCT Filed: Feb. 13, 2003

(86) PCT No.: PCT/JP03/01466

§ 371 (c)(1),
(2), (4) Date: Aug. 13, 2004

(87) PCT Pub. No.: WO03/072633

PCT Pub. Date: Sep. 4, 2003

(65) Prior Publication Data

US 2005/0107576 A1    May 19, 2005

(30) Foreign Application Priority Data

Feb. 14, 2002  (JP) ............................. 2002-037186
May 8, 2002    (JP) ............................. 2002-133156
May 10, 2002   (JP) ............................. 2002-135742
Oct. 1, 2002   (JP) ............................. 2002-288986

(51) Int. Cl.
*C08G 63/02* (2006.01)

(52) U.S. Cl. .................. 528/272; 264/244; 428/35.7; 528/279; 528/480

(58) Field of Classification Search .............. 528/275, 528/277, 279, 280, 281, 282, 283, 285, 286, 528/287, 302, 308, 308.6, 272, 480; 264/244; 428/35.7
See application file for complete search history.

(56) References Cited

U.S. PATENT DOCUMENTS

| | | | |
|---|---|---|---|
| 3,870,688 A | 3/1975 | Makimura et al. | |
| 4,205,157 A | 5/1980 | Duh | |
| 4,238,593 A | 12/1980 | Duh | |
| 5,017,680 A * | 5/1991 | Sublett | 528/274 |
| 5,262,513 A | 11/1993 | Tanaka et al. | |
| 5,478,868 A | 12/1995 | Duh | |
| 6,316,584 B1 | 11/2001 | Seidel et al. | |
| 6,346,070 B1 * | 2/2002 | Ohmatsuzawa et al. | 528/279 |
| 6,451,959 B1 * | 9/2002 | Ohmatsuzawa et al. | 528/279 |
| 6,649,731 B2 * | 11/2003 | Hori et al. | 528/279 |

FOREIGN PATENT DOCUMENTS

| | | |
|---|---|---|
| EP | 0 899 285 A2 | 3/1999 |
| EP | 0 970 983 A2 | 1/2000 |
| EP | 1 013 692 A2 | 6/2000 |
| EP | 1 114 838 A1 | 7/2001 |
| JP | 2001-89555 A | 4/2001 |
| WO | WO-99/28033 A1 | 6/1999 |

OTHER PUBLICATIONS

Plastics, vol. 34, No. 3, pp. 52-61, 1983.
A saturated polyester resin handbook, pp. 145-146, pp. 622-625, 1989.
Industrial chemistry magazine, vol. 65, No. 6, pp. 996-998, 1962.
Ben Duh; Reaction Kinetics for Solid-State Polymerization of Poly(ethylene terephthalate), Journal of Applied Polymer Science, vol. 81, No. 7, pp. 1748-1761, 2001.
Information Offer Form of JP 2003-030550.

* cited by examiner

*Primary Examiner*—Terressa Boykin
(74) *Attorney, Agent, or Firm*—Birch, Stewart, Kolasch & Birch, LLP

(57) ABSTRACT

The object of the present invention is to provide a high quality polyester resin having high productivity, stability and safety, a catalyst for polyester production with high catalytic activity, a method for producing the polyester resin with the catalyst, a polyester resin obtained with the catalyst, and a hollow molded container having the polyester resin. The polyester resin of the present invention satisfies specific parameters regarding polymerizability, stability, and metal content. The catalyst for polyester production satisfies specific parameters. The catalyst particularly preferably has: (a) a solid titanium-containing compound which has a maximum solubility in ethylene glycol of 1,000 ppm or more in terms of converted titanium amount when dissolved in ethylene glycol with heating at 150° C., and which has titanium, oxygen, carbon, and hydrogen, and optionally an alkali metal, and has a Ti—O—C bond; and (b) an alkali metal compound, the molar ratio of the alkali metal atoms to the titanium atom in the catalyst being in the range of 20/1 to 0.1/1.

20 Claims, No Drawings

POLYESTER RESIN AND CATALYST FOR POLYESTER PRODUCTION, PROCESS FOR PRODUCING POLYESTER RESIN WITH THE CATALYST, POLYESTER RESIN OBTAINED WITH THE CATALYST, AND HOLLOW MOLDED CONTAINER COMPRISING THE POLYESTER RESINS

TECHNICAL FIELD

The present invention relates to a polyester resin and a catalyst for polyester production, a method for producing a polyester resin with the catalyst, a polyester resin obtained with the catalyst, and a hollow molded container comprising the polyester resin. More specifically, the present invention relates to a polyester resin which satisfies specific parameters, a catalyst for polyester production which allows polycondensation of aromatic dicarboxylic acids and aliphatic diols at a high polymerization rate, a method for producing a polyester resin with the catalyst, a polyester resin obtained with the catalyst and a hollow molded container comprising the polyester resin.

BACKGROUND ART

A polyester resin, for example, polyethylene terephthalate is excellent in mechanical strength, heat resistance, transparency and gas barrier property, and suitably used as a material for containers used to package beverages such as juice, refresh beverage and carbonated drinks and the like, as well as a material for films, sheets and fibers.

Such polyester resin is usually prepared using dicarboxylic acid such as terephthalic acid and the like, and aliphatic diol such as ethylene glycol and the like. Specifically, first, aromatic dicarboxylic acids and aliphatic diols are subjected to esterification to form a low molecular condensate (ester oligomer), then the low molecular condensate is subjected to deglycol reaction (liquid polycondensation) under presence of polycondensation catalyst to attain a high molecular weight of the polymer. In addition, the polyester resin which is used as a material for a beverage packaging container, is usually prepared by carrying out solid polycondensation followed by elevating the molecular weight with volatizing and removing low molecular side products such as acetaldehyde which adversely affects the taste of the beverage. This polyester resin is then provided to a molding machine such as an injection molding machine to form a preform for a hollow molded body. Thereafter, the preform is inserted to a mold having a certain shape for stretch blow molding, or further heat-treated (heat set) to form a hollow molded container.

In such method for producing the polyester resin, an antimony compound, a germanium compound and the like are conventionally used as a polycondensation catalyst.

However, the polyethylene terephthalate produced by using antimony compound as a catalyst is inferior to that produced by using a germanium compound as catalyst in respect to transparency and heat resistance. On the other hand, the high cost of germanium compound increases production cost of the polyester resin. To reduce the catalyst cost, there needs a process such as recovering and recycling the germanium compound volatized in the polycondensation.

In addition, since polymerization activity per metal weight of the antimony compound or germanium compound and the like is not high, the use of relatively high concentration of the antimony compound or germanium compound or the like is needed to produce a polyester resin at a rate to satisfy industrial production. As a result, the polyester resin produced by using these compounds usually has 50 ppm to 300 ppm of antimony or germanium and the like as a metal atom.

In recent years, in view of the impact the industrial products have on the earth environment from their production to disposal, it is strongly required to reduce their adverse effect should be reduced. For example, when considering the life cycle of the polyester products as a beverage packaging container, it is important to minimize metal, in particular, heavy metal from being flown out from the polyester container to the beverage. Hence, it is preferred that the metal content in the polyester resin is low. Further, a low metal content is also preferred in burning up the polyester resin after use since the metal is a source of ash which needs additional treatment. In addition, the low metal content is also preferred in depolymerization of the polyester resin to recover and recycle the monomers after use since the metal may be a source of the impurities in the recovered monomers. As described above, reducing the content of the metal, in particular, heavy metal contained in the polyester resin has significant meanings.

By the way, titanium is known as an atom to have activity to promote the polycondensation reaction of the low molecular condensate. Titanium alkoxide, titanium tetrachloride, titanyl oxalate, orthotitanic acid and the like are well-known as a polycondensation catalyst. Many investigations have been conducted to use such titanium compounds as a polycondensation catalyst. Such titanium compounds have high polymerization activity per metal weight, and are catalysts which may reduce the amount of metal to be used, considering only the aspect of the production rate of the polyester resin. In other words, the titanium compounds may be used usually in an amount of several ppm to 50 ppm in terms of converted titanium atom in producing the polyester resin using these compounds.

Although these titanium compounds have the high polycondensation activity per metal weight, they have a strong tendency to cause undesirable polyester decomposition reaction, and cause the resin quality to be deteriorated by coloring the resin in the polycondensation process by producing the side products having low molecular compounds or by decreasing the molecular weight and the like in the melt molding process.

As a result, the polyester resin produced by using these titanium compounds as a polycondensation catalyst has low stability, and acetaldehyde produced by thermal decomposition at the time of melt molding and decrease of the molecular weight, are more prevalent than those of the polyester resin produced by using the conventional antimony compounds or germanium compounds and the like as a polycondensation catalyst. Therefore, at present, the problems still remain in using the polyester resin produced by using the titanium compounds as a polycondensation catalyst, as a material for a beverage packaging container.

On the other hand, if the amount of the above-described titanium compounds is reduced so as to decrease the deterioration of the resin quality caused by thermal decomposition at the time of melt molding the polyester resin, the polycondensation rate of the polyester resin becomes lower than that of the polyester resin produced by using the conventional antimony compound or germanium compound and the like as a polycondensation catalyst. As a result, longer polymerization time or higher polymerization temperature is required, which increases the production cost of the polyester resin.

DISCLOSURE OF INVENTION

In light of the above-described technical background, the present inventors have investigated eagerly on the polyester resin and, have found a polyester resin which satisfies the specific polymerizability parameter, and further the specific stability parameter and the metal content parameter.

The present inventors have further found that aromatic dicarboxylic acid and aliphatic diol can be subjected to polycondensation at a high production rate despite the presence of low metal amount, and that the stability of the produced polyester resin can be improved, with the use of (1) a catalyst for polyester production comprising a solid titanium-containing compound which comprises titanium, oxygen, carbon, and hydrogen, and optionally alkali metal, and has a Ti—O—C bond, and further the maximum solubility in ethylene glycol is more than a specific amount in terms of converted titanium atom; and alkali metal compound, the molar ratio of the alkali metal atoms to the titanium atom in the catalyst (alkali metal/titanium) being in a specific range; or (2) a catalyst for polyester production comprising a solid titanium-containing compound which comprises titanium, oxygen, carbon, and hydrogen, and alkali metal, and has a Ti—O—C bond, and further the maximum solubility in ethylene glycol is more than a specific amount in terms of converted titanium atom, the molar ratio of the alkali metal atoms to the titanium atom in the catalyst being in a specific range.

As a result, the present inventors have achieved the present invention.

According to the present invention, a polyester resin and a catalyst for polyester production, a method for producing a polyester resin with the catalyst, a polyester resin obtained with the catalyst, and a hollow molded container comprising the polyester resin, as follows are provided to accomplish the above-described object of the present invention.

(1) A polyester resin of which the polymerizability parameter satisfies the following formula (A-1), the stability parameter satisfies the following formula (B-1), and the metal content parameter further satisfies the following formula (C-1):

$$V_{ssp} \geq 0.025 (dl/g \cdot h) \qquad (A-1)$$

(wherein $V_{ssp}$ is calculated from the intrinsic viscosity of polyester resin and from the intrinsic viscosity of polyester resin after solid polycondensation of the polyester resin at 220° C. under nitrogen atmosphere for any hours between 2 hours to 12 hours, by the following calculation formula:

$$V_{ssp} = ([IV]_1 - [IV]_0)/T$$

$[IV]_0$ and $[IV]_1$ represent intrinsic viscosities (dl/g) before and after the solid polycondensation, respectively, and T represents solid polycondensation time (h).)

$$\Delta AA \leq 7.0 \text{ (ppm)} \qquad (B-1)$$

(wherein $\Delta AA$ is calculated from the acetaldehyde amount contained originally in the polyester resin and from the acetaldehyde amount contained in a preform obtained by molding the polyester resin with an injection molding machine at a cylinder temperature of 265 to 275° C. for 26±1 seconds of a molding cycle, by the following calculation formula:

$$\Delta AA = [AA]_1 - [AA]_0$$

$[AA]_0$ and $[AA]_1$ represent acetaldehyde contents (ppm by weight) before and after the molding, respectively.)

$$M \leq 50 \text{ (ppm)} \qquad (C-1)$$

(wherein M represents the total amount (ppm by weight) of the metal atoms contained in the polyester resin.).

(2) The polyester resin as described in (1), wherein the polycondensation time further satisfies the following formula (A-2):

$$T \leq 8 \text{ (h)} \qquad (A-2)$$

(wherein T represents solid polycondensation time (h) required for elevating the molecular weight of the polyester resin to attain an intrinsic viscosity of 0.84 dl/g by carrying out solid polycondensation of the polyester resin having an intrinsic viscosity of 0.64 dl/g at 220° C. under nitrogen atmosphere.).

(3) The polyester resin as described in (1) or (2), wherein the metal content parameter further satisfies the following formula (C-2):

$$HM \leq 2 \text{ (ppm)} \qquad (C-2)$$

(wherein HM represents the total amount (ppm by weight) of the heavy metal atoms contained in the polyester resin.).

(4) A catalyst for polyester production comprising (a) a solid titanium-containing compound which comprises titanium, oxygen, carbon, and hydrogen, and optionally alkali metal, and has a Ti—O—C bond, and further the maximum solubility in ethylene glycol when dissolved in the ethylene glycol at 150° C. is 1,000 ppm or more in terms of converted titanium atom, and (b) alkali metal compound; or (a) a solid titanium-containing compound which comprises titanium, oxygen, carbon, and hydrogen, and further alkali metal, and has a Ti—O—C bond, and further the maximum solubility in ethylene glycol when dissolved in the ethylene glycol at 150° C. is 1,000 ppm or more in terms of converted titanium atom, the molar ratio of the alkali metal atoms to the titanium atom (alkali metal/titanium) in the catalyst being in the range of 20/1 to 0.1/1.

(5) The catalyst for polyester production as described in (4), wherein the solid titanium-containing compound (a) further contains alkali metal in addition to titanium, oxygen, carbon and hydrogen.

(6) A catalyst for polyester production comprising a solid titanium-containing compound (a) which comprises titanium, oxygen, carbon, hydrogen, and alkali metal, and has a Ti—O—C bond, and further the maximum solubility in ethylene glycol when dissolved in the ethylene glycol under heating at 150° C. is 1,000 ppm or more in terms of converted titanium atom, the molar ratio of the alkali metal atoms to the titanium atom being in the range of 20/1 to 0.1/1.

(7) The catalyst for polyester production as described in any one of (4) to (6), wherein the titanium atom content in the solid titanium-containing compound (a) is 5 to 50% by weight, the carbon atom content is 1 to 35% by weight, and the weight ratio (Ti/C) of titanium atom and carbon atom is in the range of 50 to 1.

(8) The catalyst for polyester production as described in any one of (4) to (7), wherein the solid titanium-containing compound (a) contains at least one kind of element selected from the group consisting of beryllium, magnesium, calcium, strontium, barium, scandium, yttrium, lanthanum, zirconium, hafnium, vanadium, niobium, tantalum, chrome, molybdenum, tungsten, manganese, iron, ruthenium, cobalt, rhodium, nickel, palladium, copper, zinc, boron, aluminum, gallium, silicon, germanium, tin, antimony and phosphorus in addition to titanium, oxygen, carbon, hydrogen and alkali metal.

(9) The catalyst for polyester production as described in any one of (4) to (8), wherein the solid titanium-containing compound (a) is a product of contact between hydrolysate of titanium halide or hydrolysate of titanium alkoxide, and polyol.

(10) A catalyst for polyester production comprising (I) the catalyst for polyester production as described in any one of (4) to (9), and (II) a compound of at least one kind of element selected from the group consisting of-beryllium, magnesium, calcium, strontium, barium, boron, aluminum, gallium, manganese, cobalt, zinc, germanium, antimony and phosphorus.

(11) The catalyst for polyester production as described in any one of (4) to (10), wherein the solid titanium-containing compound (a) is a titanium-containing solution in which the solid titanium-containing compound (a) is dissolved in ethylene glycol-containing solution (c) in an amount of 500 to 100,000 ppm in terms of converted titanium atom.

(12) The catalyst for polyester production as described in (11), wherein the titanium-containing solution is obtained by adding the alkali metal compound (b) when the solid titanium-containing compound (a) is dissolved in the ethylene glycol-containing solution (c).

(13) The catalyst for polyester production as described in (11) or (12), wherein the titanium-containing solution contains a solubilizing aid in the range of 1 to 50% by weight, relative to the ethylene glycol-containing solution (c).

(14) The catalyst for polyester production as described in (13), wherein the solubilizing aid is glycerin or trimethylol propane.

(15) The catalyst for polyester production as described in (13) or (14), wherein the water content of the titanium-containing solution is in the range of 0.05 to 15.0% by weight.

(16) The catalyst for polyester production as described in any one of (4) to (15), substantially comprising no antimony compound and germanium compound.

(17) A method for producing a polyester resin, wherein aromatic dicarboxylic acid or an ester-forming derivative thereof and aliphatic diol or an ester-forming derivative thereof are subjected to polycondensation to produce the polyester resin under presence of the catalyst for polyester production as described in any one of (4) to (16).

(18) A polyester resin produced by polycondensation of aromatic dicarboxylic acid or an ester-forming derivative thereof and aliphatic diol or an ester-forming derivative thereof under presence of the catalyst for polyester production as described in any one of (4) to (16).

(19) The polyester resin as described in (18), made by solid polycondensation having an intrinsic viscosity of 0.60 dl/g or more.

(20) A hollow molded container comprising the polyester resin as described in (18) or (19).

BEST MODE FOR CARRYING OUT THE INVENTION

Hereinafter, the polyester resin, the catalyst for polyester production, the method for, producing the polyester resin with the catalyst, the polyester resin obtained with the catalyst and the hollow molded container comprising the polyester resin according to the present invention will be explained.

Polyester Resin

In the polyester resin of the present invention, the polymerizability parameter satisfies the following formula (A-1), the stability parameter satisfies the following formula (B-1), and the metal content parameter further satisfies the following formula (C-1):

$$V_{ssp} \geq 0.025 \text{ (dl/g·h)} \tag{A-1}$$

(wherein $V_{ssp}$ is calculated from the intrinsic viscosity of the polyester resin, and from the intrinsic viscosity of a polyester resin obtained by solid polycondensation of this polyester resin at 220° C. under nitrogen atmosphere for any hours between 2 hours and 12 hours, by the following calculation formula:

$$V_{ssp} = ([IV]_1 - [IV]_0)/T$$

wherein $[IV]_0$ and $[IV]1$ represent intrinsic viscosities (dl/g) before and after the solid polycondensation, respectively, and T represents solid polycondensation time (h).);

$$\Delta AA \leq 7.0 \text{ (ppm)} \tag{B-1}$$

(wherein $\Delta AA$ is calculated from the acetaldehyde amount contained originally in the polyester resin, and from the acetaldehyde amount contained in the preform obtained by molding this polyester resin with an injection molding machine at a cylinder temperature of 265 to 275° C. for 26±1 seconds of a molding cycle, by the following calculation formula:

$$\Delta AA = [AA]_1 - [AA]_0$$

wherein $[AA]_0$ and $[AA]_1$ represent acetaldehyde contents (ppm by weight) before and after the molding, respectively.)

$$M \leq 50 \text{ (ppm)} \tag{C-1}$$

(wherein M represents the total amount (ppm by weight) of the metal atoms contained in the polyester resin.).

$V_{ssp}$, the polymerizability parameter of the polyester resin as described in Formula (A-1) herein, indicates the increasing rate of intrinsic viscosity per hour when the polyester resin is subjected to solid polycondensation at 220° C. under nitrogen atmosphere for any hours between 2 hours and 12 hours. According to the experiments by the present inventors, if the solid polycondensation time is less than 2 hours, the temperature or atmosphere in the reaction system is not stable. In addition, if solid polycondensation time is more than 12 hours, the increasing rate of intrinsic viscosity is saturated. In either case, linear correlation between the intrinsic viscosity and the solid polycondensation time is lost. However, if the solid polycondensation time is within the range of 2 hours to 12 hours, $V_{ssp}$ can be considered as nearly constant.

Formula (A-1) indicates that the polyester resin according to the present invention has comparable or higher polymerizability as compared with the polyester resin produced by using the antimony compound or germanium compound that is currently used in the industry. In other words, the polyester resin according to the present invention can be produced at a comparable or higher production rate as compared with that of the polyester resin produced by using the existing antimony compound or germanium compound.

$\Delta AA$, the stability parameter of the polyester resin as described in Formula (B-1), indicates the increased amount of the acetaldehyde when the polyester resin in an injection molding machine is molded at a cylinder temperature of 265 to 275° C. of for 26±1 seconds of a molding cycle to obtain a preform. Formula (B-1) indicates that the polyester resin according to the present invention has comparable or less increased amount of acetaldehyde as compared with the polyester resin produced by using the antimony compound or germanium compound that is currently used in the industry. The acetaldehyde is produced by decomposition of the polyester resin by heating at the time of preform molding and by the action of the polycondensation catalyst contained in the polyester resin. The acetaldehyde is the cause that gives beverages off-taste and off-odor when the polyester resin is used for a beverage container. In other words, by using the polyester resin according to the present invention, a beverage packaging container can be produced in a comparable or better quality as compared with that obtained by using the existing antimony compound or germanium compound.

M, the metal content parameter of the polyester resin as described in Formula (C-1), indicates the total amount of the metal atoms contained in the polyester resin. As described in the BACKGROUND ART of the invention, it is desirable to reduce the metal content in the polyester resin to minimize its adverse effect on the earth environment. In addition, the polyester resin produced by using the antimony compound or germanium compound that is currently used in the industry as described also in the BACKGROUND ART of invention, contains usually 50 to 300 ppm of the metal atoms.

Formula (C-1) indicates that the polyester resin according to the present invention has a comparable or less metal content as compared with the polyester resin produced by using the antimony compound or germanium compound that is currently used in the industry. In other words, it indicates that the polyester resin according to the present invention has comparable or better environment safety as compared with the polyester resin produced by using the existing antimony compound or germanium compound.

In the polyester resin according to the present invention, the polycondensation time preferably further satisfies the following formula (A-2):

$$T \leq 8 \text{ (h)} \quad (A-2)$$

(wherein T represents solid polycondensation time (h) required for elevating the molecular weight of the polyester resin to the intrinsic viscosity of 0.84 dl/g by carrying out solid polycondensation of the polyester resin having an intrinsic viscosity of 0.64 dl/g at 220° C. under nitrogen atmosphere.)

In the polyester resin according to the present invention, the metal content parameter of the produced polyester resin preferably further satisfies the following formula (C-2):

$$HM \leq 2 \text{ (ppm)} \quad (C-2)$$

(wherein HM represents the total amount (ppm by weight) of the heavy metal atoms contained in the polyester resin.

The heavy metal herein indicates the elements from Group III except radium, scandium and yttrium, the elements from Group IV except titanium, all the elements from Groups V to XII, the elements from Group XIII except boron and aluminum, the elements from Group XIV except carbon and silicon, the elements from Group XV except nitrogen, phosphorus and arsenic, and the elements from Group XVI except oxygen, sulfur and selenium as classified in 'Metal Toxicology' edited by Kenzaburo Tsuchiya and published by Ishiyaku Publisher, (1983).

Catalyst for Polyester Production

The catalyst for polyester production according to the present invention comprises (a) a solid titanium-containing compound which comprises titanium, oxygen, carbon hydrogen, and alkali metal, and has a Ti—O—C bond, and further the maximum solubility in ethylene glycol when dissolved in the ethylene glycol at 150° C. is 1,000 ppm or more in terms of converted titanium atom, or (a) a solid titanium-containing compound which comprises titanium, oxygen, carbon, and hydrogen, and optionally alkali metal, and has a Ti—O—C bond, and further the maximum solubility in ethylene glycol when dissolved in the ethylene glycol at 150° C. is 1,000 ppm or more in terms of converted titanium atom; and (b) alkali metal compound.

(a) Solid Titanium-Containing Compound

The solid titanium-containing compound (a) which forms the catalyst for polyester production according to the present invention comprises titanium, oxygen, carbon, and hydrogen, and optionally alkali metal, and has a Ti—O—C bond.

The alkali metal herein includes Li, Na, K, Rb and Cs.

Solid titanium-containing compound (a) preferably contains titanium in an amount of 5 to 50% by weight, and preferably (5 to 40)% by weight, oxygen in an amount of (35 to 75)% by weight, and preferably (40 to 60)% by weight, carbon in an amount of 1 to 35% by weight, and preferably (5 to 25)% by weight, and hydrogen in an amount of (1 to 10)% by weight, and preferably (1 to 6)% by weight.

If the solid titanium-containing compound (a) contains titanium, oxygen, carbon and hydrogen in the above range, the solid titanium-containing compound exhibits good solubility.

The alkali metal is preferably contained in an amount that the molar ratio of the alkali metal atoms to the titanium atom (alkali metal/titanium) in the solid titanium-containing compound (a) is in the range of 20/1 to 0.1/1, and preferably 10/1 to 0.1/1.

If the molar ratio of the alkali metal atoms to the titanium atom in the solid titanium-containing compound (a) is in the above range, a high quality polyester resin can be produced with high polymerization activity and improved solubility. If the alkali metal atom content is less than the above range, the effect to the activity and quality by containing the alkali metal may not be obtained sufficiently. In addition, if the alkali metal atom content is more than the above range, to the contrary the activity may decrease.

In addition, if the solid titanium-containing compound (a) has Ti—O—C bond, the solubility of the solid titanium-containing compound is preferably good.

In the solid titanium-containing compound (a), the weight ratio (Ti/C) of titanium atom and carbon atom is in the range of 50 to 1, and preferably 25 to 2.

If the weight ratio of titanium atom and carbon atom is within the above range, it has the following effects. If the weight ratio is less than the upper limit of this range, carbon can reach solid though carbon is derived from specific liquid alcohol. In addition, if the weight ratio is more than the lower limit of this range, the maximum solubility in ethylene glycol becomes at least 1000 ppm.

The titanium content in the solid titanium-containing compound (a) can be measured, for example, by ICP analysis, and the content of other elements can be measured, for example, by element analysis.

In addition, Ti—O—C bond in the solid titanium-containing compound (a), can be confirmed by element analysis, EXAFS analysis and $^{13}$C-NMR analysis.

Maximum solubility of the solid titanium-containing compound in ethylene glycol when the solid titanium-containing compound is dissolved in ethylene glycol under heating at 150° C., is 1000 ppm or more, preferably 1500 ppm or more, and more preferably 2000 ppm or more in terms of converted titanium atom.

If the maximum solubility in ethylene glycol when the solid titanium-containing compound is dissolved in ethylene glycol under heating at 150° C., is much less than the above range, the amount of the solvent which is added to the polymerization reactor when the catalyst is added to the polymerization reactor, become undesirably excessive and affects the polymerization, and dissolution becomes difficult.

For the maximum solubility in ethylene glycol of the solid titanium-containing compound (a), the solid titanium-containing compound (a) is dissolved in 100 g of ethylene glycol which is solvent under heating at 150° C., the transparency of the solution is measured with a hazemeter. The amount exceeding 10% is checked, and from the amount of the solid titanium-containing compound at this time, the maximum solubility is determined.

Mean particle diameter of the solid titanium-containing compound (a) is preferably 1 to 30 μm, and more preferably 1.5 to 20 μm.

If the mean particle diameter of the solid titanium-containing compound (a) is within the above range, the solubility of the solid titanium-containing compound is preferably good.

In addition, the degree of crystallization of the solid titanium-containing compound (a) which is derived from the structure of anatase-type titanium dioxide and calculated from X ray diffraction pattern having 2θ (the angle of diffraction) in the range of 18° to 35°, is preferably 50% or less. If the degree of crystallization is 50% or less, the catalytic activity is excellent, and the solubility of the solid titanium-containing compound is preferably good.

The solid titanium-containing compound (a) may contain other elements than titanium, oxygen, carbon and hydrogen (hereinafter, it may be simply referred to as "other elements"). Such elements include at least one kind of element selected from the group consisting of beryllium, magnesium, calcium, strontium, barium, scandium, yttrium, lanthanum, zirconium, hafnium, vanadium, niobium, tantalum, chrome, molybdenum, tungsten, manganese, iron, ruthenium, cobalt, rhodium, nickel, palladium, copper, zinc, boron, aluminum, gallium, silicon, germanium, tin, antimony and phosphorus. Among these, magnesium is preferred. These other elements may be contained in the solid titanium-containing compound in combinations of two or more.

In the solid titanium-containing compound (a) containing the other elements, the molar ratio (M/Ti) of titanium (Ti) and the other elements (M) is in the range of 1/50 to 50/1, preferably 1/40 to 40/1, and more preferably 1/30 to 30/1.

If the molar ratio of titanium (Ti) in the solid titanium-containing compound (a) and the other elements (M) is within the above range, the catalytic activity is excellent, and there is no adverse effect on the solubility of the solid titanium-containing compound, hence the above range is preferred.

The solid titanium-containing compound (a) can be used as a titanium-containing solution by dissolving in the ethylene glycol-containing solution (c) as described below.

If the solid titanium-containing compound (a) does not contain the alkali metal, it can be used as the catalyst for polyester production in combination with the alkali metal compound (b). If the solid titanium-containing compound (a) contains the alkali metal, it can be used as the catalyst for polyester production alone or in combination with the alkali metal compound (b). In either case, it may be used as the catalyst for polyester production in combination with the compound (II) which will be described below.

(b) Alkali Metal Compound

The alkali metal compound (b) that forms the catalyst for polyester production according to the present invention is at least one kind of alkali metal compound selected from the group consisting of simple substance of alkali metal, alkali metal hydride, alkali metal hydroxide, alkali metal alkoxide, alkali metal halide, and alkali metal salt of acid selected from carbonic acid, nitric acid, nitrous acid, sulfuric acid, sulfurous acid, organic sulfonic acid, phosphoric acid, phosphorous acid, hypophosphite, meta-phosphoric acid, polyphosphoric acid, organic phosphonic acid, organic phophinic acid, boric acid, aluminum acid, titanium acid, silic acid, aliphatic acid, aromatic carboxylic acid, hydroxycarboxylic acid and amino acid.

The simple substance of the alkali metal includes Li, Na, K, Rb and Cs.

The alkali metal hydride includes LiH, NaH, KH, RbH and CsH.

The alkali metal hydroxide includes lithium hydroxide, sodium hydroxide, potassium hydroxide, rubidium hydroxide, cesium hydroxide and the like.

The alkali metal alkoxide compound includes sodium methoxide, sodium ethoxide and the like.

The alkali metal halide includes lithium fluoride, sodium fluoride, potassium fluoride, rubidium fluoride, cesium fluoride, lithium chloride, sodium chloride, potassium chloride, rubidium chloride, cesium chloride, lithium bromide, sodium bromide, potassium bromide, rubidium bromide, cesium bromide, lithium iodide, sodium iodide, potassium iodide, rubidium iodide, cesium iodide and the like.

The alkali metal salt of acid selected from carbonic acid, nitric acid, nitrous acid, sulfuric acid, sulfurous acid, organic sulfonic acid, phosphoric acid, phosphorous acid, hypophosphite, meta-phosphoric acid, polyphosphoric acid, organic phosphonic acid, organic phophinic acid, boric acid, aluminum acid, titanium acid, silic acid, aliphatic acid, aromatic carboxylic acid, hydroxycarboxylic acid, and amino acid includes alkali metal salt of aliphatic acid such as sodium acetate, sodium propionate, sodium butyrate, sodium caproate, sodium caprylate, sodium caprate, sodium laurate, sodium myristate, sodium palmitate, sodium stearate and the like; alkali metal salt of hydroxycarboxylic acid such as sodium glycolate, sodium lactate, sodium malate, sodium tartarate, sodium citrate, sodium gluconate and the like; alkali metal salt of amino acid such as sodium glutamate, sodium asparaginate and the like.

Among these alkali metal compounds (b), sodium hydroxide, potassium hydroxide, sodium methoxide, sodium acetate, sodium stearate and the like are preferred.

The alkali metal compound (b) may be used alone or in combinations of two or more.

Alkali metal compound (b) is preferably used in such an amount that the molar ratio of alkali metal in the alkali metal compound (b), and titanium in the solid titanium-containing compound (a) or in the titanium-containing solution (alkali metal/titanium), or the molar ratio of alkali metal in the solid titanium-containing compound (a) and in alkali metal compound (b), and titanium in the solid titanium-containing compound (a) or in the titanium-containing solution (alkali metal/titanium) if solid titanium-containing compound (a) contains alkali metal, is in the range of 20/1 to 0.1/1, and preferably 10/1 to 0.1/1.

If the molar ratio of titanium atom in the solid titanium-containing compound (a) or in the titanium-containing solution, and alkali metal atom is within the above range, a high quality polyester resin can be produced with high polymerization activity and improved solubility. If the content of the alkali metal compound (b) is less than the above range, the effect to the activity and quality by containing the alkali metal may not be obtained sufficiently, while if the content of the alkali metal compound (b) is more than the above range, to the contrary the activity may decrease.

Compound (II)

The compound (II) is a compound of at least one kind of element selected from the group consisting of beryllium, magnesium, calcium, strontium, barium, boron, aluminum, gallium, manganese, cobalt, zinc, germanium, antimony and phosphorus.

The compound of at least one kind of element selected from the group consisting of beryllium, magnesium, calcium, strontium, barium, boron, aluminum, gallium, manganese, cobalt, zinc, germanium, antimony and phosphorus, includes aliphatic acid salt of these elements such as acetate and the like, carbonate, sulfate, nitrate and halide such as chloride and the like of these elements, acetylacetonate salt of these elements, oxide of these elements and the like, acetate or carbonate being preferred.

In addition, the phosphorus compound includes phosphate or phosphite of at least one kind of metal selected from Group I and Group II of the Periodic Table of Elements, transition metals of Group IV of the Periodic Table, zirconium, hafnium and aluminum.

Preferred examples of the compound (II) which is optionally used in the present invention, include the following.

The aluminum compounds include aluminum salt of aliphatic acid such as aluminum acetate and the like, aluminum carbonate, aluminum chloride, aluminum acetylacetonate salt and the like. In particular, aluminum acetate or aluminum carbonate is preferred.

The barium compounds include barium salt of aliphatic acid such as barium acetate and the like, barium carbonate, barium chloride, barium acetylacetonate salt and the like. In particular, barium acetate or barium carbonate is preferred.

The cobalt compounds include cobalt salt of aliphatic acid such as cobalt acetate and the like, cobalt carbonate, cobalt chloride, cobalt acetylacetonate salt and the like. In particular, cobalt acetate or cobalt carbonate is preferred.

The magnesium compounds include magnesium salt of aliphatic acid such as magnesium acetate and the like, magnesium carbonate, magnesium chloride, magnesium acetylacetonate salt and the like. In particular, magnesium acetate or magnesium carbonate is preferred.

The manganese compounds include manganese salt of aliphatic acid such as manganese acetate and the like, manganese carbonate, manganese chloride, manganese acetylacetonate salt and the like. In particular, manganese acetate or manganese carbonate is preferred.

The strontium compounds include strontium salt of aliphatic acid such as strontium acetate and the like, strontium carbonate, strontium chloride, strontium acetylacetonate salt and the like. In particular, strontium acetate or strontium carbonate is preferred.

The zinc compounds include zinc salt of aliphatic acid such as zinc acetate and the like, zinc carbonate, zinc chloride, zinc acetylacetonate salt and the like. In particular, zinc acetate or zinc carbonate is preferred.

The germanium compounds include germanium dioxide, germanium acetate and the like.

The antimony compounds include antimony dioxide, antimony acetate and the like.

The phosphates among the phosphorus compounds include lithium phosphate, lithium dihydrophosphate, dilithium hydrophosphate, sodium phosphate, sodium dihydrophosphate, disodium hydrophosphate, potassium phosphate, potassium dihydrophosphate, dipotassium hydrophosphate, strontium phosphate, strontium dihydrophosphate, distrontium hydrophosphate, zirconium phosphate, barium phosphate, aluminum phosphate, zinc phosphate and the like. Among these, in particular sodium phosphate, sodium dihydrophosphate, disodium hydrophosphate, potassium phosphate, potassium dihydrophosphate and dipotassium hydrophosphate are preferably used.

In addition, the phosphites among the phosphorus compounds include phosphite of at least one kind of metal selected from alkali metal, alkali earth metal, transition metals of Group IV of the Periodic Table, zirconium, hafnium, and aluminum. Specifically, the phosphite includes lithium phosphite, sodium phosphite, potassium phosphite, strontium phosphite, zirconium phosphite, barium phosphite, aluminum phosphite, zinc phosphite and the like. Among these, in particular sodium phosphate and potassium phosphite are preferably used.

Among these, the compound (II) is preferably a magnesium compound such as magnesium carbonate, magnesium acetate and the like; a calcium compound such as calcium carbonate, calcium acetate and the like; or a zinc compound such as zinc chloride, zinc acetate and the like.

These compounds (II) can be used alone or in combinations of two or more.

Such compound (II) is preferably used in an amount that the molar ratio (M/Ti) of titanium (Ti) in the solid titanium-containing compound (a) or in the titanium-containing solution, and metal atom (M) in the compound (II) is in the range of 1/50 to 50/1, preferably 1/40 to 40/1, and more preferably 1/30 to 30/1. Further, f the phosphorus compound such as phosphate or phosphite and the like is used, it is in terms of converted metal atoms contained in the phosphorus compound.

If molar ratio of titanium in the solid titanium-containing compound (a) or in the titanium-containing solution, and metal atom in the compound (II) is within the above range, the effect of improved activity by using the compound (II) is obtained sufficiently. If the amount of the compound (II) is less than the above range, the above effect may not be obtained. In addition, if the amount of the compound (II) is more than the above range, the quality of the polyester resin obtained may be deteriorated.

In addition, if a magnesium compound is used as the compound (II), the magnesium compound is preferably used in an amount that weight ratio (Mg/Ti) of titanium (Ti) in the solid titanium-containing compound (a) or in the titanium-containing solution and Mg atom in the magnesium compound is in the range of 0.01 or more, preferably 0.06 to 10, and particularly preferably 0.06 to 5. If the magnesium compound is used within the above range, transparency of the obtained polyester resin is excellent.

Process for Producing the Solid Titanium-Containing Compound (a)

The solid titanium-containing compound (a) that forms the catalyst for polyester production according to the present invention can be obtained, for example, by dehydrating and drying the hydrolysate (h-1) which is obtained by hydrolysis of titanium halide or titanium alkoxide, under coexistence of polyol.

As the titanium halide, a compound in which at least one bond between titanium atom and halogen atom exist(s) in the molecule is used. Specifically, the titanium halide includes titanium tetrahalide such as titanium tetrachloride, titanium tetrabromide, titanium tetraiodide and the like;

titanium trihalide such as titanium trichloride and the like; dihalide such as titanium dichloride and the like and titanium monohalide. The titanium halide may be diluted to two times or so with water before use. In addition, titanium alkoxide specifically includes titanium tetrabutoxide, titanium tetraisopropoxide and the like.

A method for hydrolyzing titanium halide or titanium alkoxide is not particularly limited, but includes, for example, (i) a method to add titanium halide or titanium alkoxide to water, (ii) a method to add water to titanium halide or titanium alkoxide, (iii) a method to pass gas including vapor of titanium halide or titanium alkoxide through water, (iv) a method to pass gas including water vapor through titanium halide or titanium alkoxide, (v) a method to contact gas including titanium halide or titanium alkoxide with gas including water vapor, and the like.

The above method for hydrolysis in the present invention not specially limited, but in any case, largely excessive water is needed to react with titanium halide or titanium alkoxide to conduct hydrolysis completely. If hydrolysis does not proceed completely, thus the obtained hydrolysate is a partial hydrolysate as described in Japanese Examined Patent Application Publication No. 51-19477, the activity as a polycondensation catalyst may not be sufficient.

The temperature of hydrolysis is usually 100° C. or lower, and preferably 0 to 70° C.

Hydrolysate (h-1) of titanium halide or titanium alkoxide obtained by the hydrolysis is a gel of a hydroxide hydrate composite containing a hydroxide hydrate, which is also referred to as orthotitanic acid, at this stage. This hydroxide hydrate gel is dehydrated and dried as described below under coexistence of polyol to give a solid titanium-containing compound (a).

If the titanium halide is subjected to hydrolysis as described above, an acidic solution comprising the hydrolysate (h-1) of titanium halide is obtained, and the pH of this acidic solution is usually approximately 1.

If titanium halide is used as a raw material, the pH of the solution comprising the hydrolysate (h-1) is preferably adjusted to 2 to 6 before dehydrating and drying. A method for adjusting the pH includes a method to adjust the pH to 2 to 6 with an acid after alkalifying first with a base, a method to adjust the pH of the solution comprising the hydrolysate (h-1) to 2 to 6 directly with a base, and the like.

The method for adjusting the pH to 2 to 6 with an acid after alkalifying pH first with a base is not specially limited, but includes, for example, a method in which the pH is first adjusted to 9 to 12 with ammonia or sodium hydroxide, potassium hydroxide, sodium carbonate, potassium carbonate and the like, and then, the pH is adjusted to 2 to 6 with acetic acid or nitric acid and the like.

In addition, the method to adjust the pH of the solution comprising the hydrolysate (h-1) to 2 to 6 directly with a base is not specially limited, but includes, for example, a method in which the pH is adjusted with ammonia or sodium hydroxide, potassium hydroxide, sodium carbonate, potassium carbonate and the like to pH 2 to 6, in which the titanium compound is precipitated.

The temperature in adjusting the pH of the solution comprising the hydrolysate (h-1) is usually 50° C. or lower, and preferably 40° C. or lower.

By adjusting the pH of the solution comprising the hydrolysate (h-1) to 2 to 6, a precipitate is produced.

If the pH of the solution comprising the hydrolysate (h-1) is adjusted to 2 to 6 before dehydrating and drying as described above, dehydration process can be carried out in short time. In addition, the level of nitrogen and the like derived from the base remain low in the catalyst, and the deterioration in activity as a polycondensation catalyst or in quality of the polyester resin produced by the catalyst is reduced.

In addition, the solid titanium-containing compound (a) that forms the catalyst for polyester production according to the present invention can be obtained by dehydrating and drying the hydrolysate (h-2) which is obtained by hydrolysis of a mixture of titanium halide or titanium alkoxide and a compound of the element selected from at least one kind of the other elements or a precursor thereof (hereinafter, it may be referred to as "compound of the other elements") under coexistence of polyol.

The compound of the other elements includes, for example, hydroxide of the above-described elements, and the like. These compounds of the other elements can be used alone or in combinations of two or more.

The method for hydrolyzing the mixture of titanium halide or titanium alkoxide and the compounds of the other elements is not particularly limited, but includes, for example, (i) a method to add titanium halide or titanium alkoxide to water in which the compounds of the other elements are dissolved or suspended, (ii) a method to add a mixture of titanium halide or titanium alkoxide and the compounds of the other elements to water, (iii) a method to add water to a mixture of titanium halide or titanium alkoxide and the compounds of the other elements, (iv) a method to add water in which the compounds of the other elements are dissolved or suspended, to titanium halide or titanium alkoxide, (v) a method to pass gas including vapor of titanium halide or titanium alkoxide through water in which the compounds of the other elements are dissolved or suspended, (vi) a method to pass gas including vapor of titanium halide or titanium alkoxide and vapor of the compounds of the other elements through water, (vii) a method to pass gas including water vapor through a mixture of titanium halide or titanium alkoxide and the compounds of the other elements, (viii) a method to pass gas including water vapor and vapor of the compounds of the other elements through titanium halide or titanium alkoxide, (ix) a method to contact gas including titanium halide or titanium alkoxide and gas including vapor of the compounds of the other elements with gas including water vapor, and the like.

The above method for hydrolysis in the present invention is not specially limited, but in any case, largely excessive water is needed to react with a mixture of titanium halide or titanium alkoxide and the compounds of the other elements to conduct hydrolysis completely. If hydrolysis does not proceed completely, thus obtained hydrolysate is a partial hydrolysate, the activity as a polycondensation catalyst may not be sufficient.

In the hydrolysis, the molar ratio (M/Ti) of titanium (Ti) in titanium halide or titanium alkoxide and the other element (M) in the compounds of the other elements is preferably in the range of 1/50 to 50/1. In addition, the temperature of hydrolysis is usually 100° C. or lower, and preferably, 0 to 70° C.

The hydrolysate (h-2) of the mixture of titanium halide or titanium alkoxide and the compounds of the other elements, obtained by the hydrolysis, is a gel of hydroxide hydrate, which is also referred to as orthotitanic acid, at this stage. This hydroxide hydrate gel is hydrated and dried as described below under coexistence of polyol to give a solid titanium-containing compound (a).

The pH of the solution comprising the hydrolysate (h-2) is preferably adjusted.

A method for adjusting the pH of the solution comprising the hydrolysate (h-2) includes a method same as the method for adjusting the pH of the solution comprising the hydrolysate (h-1) as described above.

By adjusting the pH of the solution comprising the hydrolysate (h-2) to 2 to 6, a precipitate is produced.

If the pH of the solution comprising the hydrolysate (h-2) is adjusted to 2 to 6 before dehydrating and drying as described above, dehydration process can be carried out in short time. In addition, the level of nitrogen and the like derived from the base remain low in the catalyst, and the deterioration in activity as a polycondensation catalyst or in quality of the polyester resin produced by the catalyst is reduced.

In addition, the solid titanium-containing compound (a) that forms the catalyst for polyester production according to the present invention, can be obtained by dehydrating and drying a mixture of the hydrolysate (h-1) obtained by hydrolysis of titanium halide or titanium alkoxide, and hydrolysate (h-3) obtained by hydrolysis of the compounds of the other elements or a precursor thereof, under coexistence of polyol.

The compounds of the other elements may be used alone or in combinations of two or more.

The method for hydrolyzing the compounds of the other elements or a precursor thereof is not particularly limited, but it may be carried out, for example, by a method same as the method for preparing the hydrolysate (h-1) except using the compounds of the other elements or a precursor thereof instead of titanium halide or titanium alkoxide. By hydrolyzing the compounds of the other elements or a precursor thereof, a solution comprising the hydrolysate (h-3) is obtained.

A mixture of the hydrolysate (h-1) obtained by hydrolysis of titanium halide or titanium alkoxide, and hydrolysate (h-3) obtained by hydrolysis of the compounds of the other elements or a precursor thereof can be prepared by mixing solution of the hydrolysate (h-1) and solution of the hydrolysate (h-3), which are prepared separately according to the above methods.

Hydrolysate (h-1) and hydrolysate (h-3) are preferably mixed in such a ratio that molar ratio (E/Ti) of titanium (Ti) in hydrolysate (h-1) and the other elements (M) in hydrolysate (h-3) is in the range of 1/50 to 50/1.

This mixture is dehydrated and dried as described below under coexistence of polyol to give a solid titanium-containing compound (a).

The pH of the solution comprising the hydrolysate (h-1) and hydrolysate (h-3) is preferably adjusted. A method for adjusting the pH of the solution including hydrolysate (h-1) and hydrolysate (h-3) includes a method same as the method for adjusting the pH of the solution comprising the hydrolysate (h-1) as described above.

By adjusting the pH of the solution comprising the hydrolysate (h-1) and hydrolysate (h-3) to 2 to 6, a precipitate is produced.

If the pH of the solution comprising the hydrolysate (h-1) and hydrolysate (h-3) is adjusted to 2 to 6 before dehydrating and drying as described above, dehydration process can be carried out in short time. In addition, the level of nitrogen and the like derived from the base remain low in the catalyst, and the deterioration in activity as a polycondensation catalyst or in quality of the polyester resin produced by the catalyst is reduced.

Next, the hydrolysate (h-1), (h-2) or (h-3) is dehydrated and dried below under coexistence of polyol to give a solid titanium-containing compound (a).

The polyol which coexists in dehydrating and drying the hydrolysate (h-1), (h-2) or (h-3) specifically includes di-valent alcohol such as ethylene glycol and the like; tri-valent alcohol such as glycerin and the like. Among these, di-valent alcohol and tri-valent alcohol are preferred. In particular, ethylene glycol and glycerin are preferred.

A method to make polyol coexist in dehydrating and drying the hydrolysate (h-1), (h-2) or (h-3) includes, for example, a method comprising suspending the hydrolysate (h-1), (h-2) or (h-3) in water containing 1 to 90% by weight, preferably 2 to 80% by weight, and particularly preferably 5 to 50% by weight of polyol, followed by drying the suspension. In this case, the hydrolysate (h-1), (h-2) or (h-3) is desirably made to a slurry, and maintained for several minutes to several hours.

A method to dry the slurry after the maintenance includes a method to dry the slurry after the solid-liquid, a method to use a spray drier as a machine for granulating and drying and the like. A spray drier is preferably used.

In dehydrating and drying the slurry with a spray drier as a machine for granulating and drying, a slurry comprising, for example, 0.1 to 15% by weight, and preferably 0.5 to 10% by weight of the hydrolysate (h-1), (h-2) or (h-3) is sprayed under atmosphere of usually 80 to 250° C., and preferably 120 to 200° C., to give a solid titanium-containing compound (a).

Thus obtained solid titanium-containing compound (a) has particle size which is preferably in the range of 1 to 30 μm.

The solid titanium-containing compound (a) varies depending on the kind or the concentration of the coexisting polyol, a drying method, and the extent of dryness. However, titanium content in the solid titanium-containing compound (a) is usually in the range of 5 to 50% by weight. If the titanium content is more than 50% by weight, the effect by incorporating polyol scarcely exhibits. In addition, if the titanium content is less than 5% by weight, the amount of the remaining polyol is so high that uniform solid titanium-containing compound (a) cannot be obtained.

If the solid titanium-containing compound (a) contains the other elements, the molar ratio (M/Ti) of titanium (Ti) in the solid titanium-containing compound (a) and the other elements M is in the range of 1/50 to 50/1, preferably 1/40 to 40/1, and more preferably 1/30 to 30/1.

If the molar ratio (M/Ti) of titanium (Ti) in the solid titanium-containing compound (a) and the other elements (M) is within the above range, the effect of elevation of activity can be sufficiently obtained by using the other elements. If the amount of the other elements is less than the above range, the above effect may not be obtained. In addition, if the amount of the other elements is more than the above range, the quality of the polyester resin obtained may be deteriorated.

In the present invention, the titanium content in the solid titanium-containing compound (a) can be measured for example, by ICP analysis.

If titanium halide is used in the solid titanium-containing compound (a) as a raw material, the halogen element content is usually 0 to 10,000 ppm, and preferably 0 to 100 ppm.

The solid titanium-containing compound (a) may be used as a catalyst by dissolving in ethylene glycol-containing solution (c) including ethylene glycol. When the solid titanium-containing compound (a) is dissolved in ethylene glycol-containing solution (c), it is dissolved preferably under presence of a basic compound such as the alkali metal compound (b) and the like.

When the solid titanium-containing compound (a) is dissolved in ethylene glycol-containing solution (c), it is dissolved preferably under heating. The heating temperature is usually in the range of 100 to 200° C., and preferably 110 to 195° C.

When the alkali metal compound (b) is used, it is used in such an amount that the molar ratio of alkali metal to titanium in the solution (alkali metal/titanium) is in the range of 20/1 to 0.1/1.

If the alkali metal/titanium ratio is within the above range, a high quality polyester resin can be produced with high polymerization activity and improved solubility. If the amount used of the alkali metal compound (b) is less than the above range, the effect to the activity and quality by containing the alkali metal compound (b) may not be obtained sufficiently. In addition, if the amount used of the alkali metal compound (b) is more than the above range, to the contrary the activity may decrease.

In the present invention, when the solid titanium-containing compound (a) is dissolved in ethylene glycol-containing solution (c) under presence of the alkali metal compound (b), ethylene glycol-containing solution (c) may include a solubilizing aid, if necessary. In addition, if the alkali metal compound (b) is not used when solid titanium-containing compound (a) is dissolved in ethylene glycol-containing solution (c), ethylene glycol-containing solution (c) may include a solubilizing aid and/or an acid component, if necessary.

The solubilizing aid includes glycerin, trimethylol propane, propylene glycol, pentaerythritol, sorbitol and the like. Glycerin or trimethylol propane is preferred.

The solubilizing aid is used in an amount of 1 to 50% by weight, and preferably 1 to 25% by weight, relative to ethylene glycol-containing solution (c).

The acid component includes organic sulfonic acid such as sulfuric acid, para-toluene sulfonic acid and the like; organic carboxylic acid such as oxalic acid, acetic acid, citric acid and the like. Sulfuric acid or organic sulfonic acid is preferred.

The acid component is used in an amount of 0.1 to 20% by weight, and preferably 0.1 to 10% by weight, relative to the ethylene glycol-containing solution.

A titanium-containing solution which is a solution in which solid titanium-containing compound (a) is dissolved in ethylene glycol-containing solution (c), is prepared by a method as described above.

This titanium-containing solution is preferably transparent. HAZE value measured by a hazemeter in the method as described below is 30% or less, preferably 20% or less, and more preferably 10% or less.

If HAZE value of the titanium-containing solution is within the above range, it is easy to add at the time of polymerization. If HAZE value exceeds the above range, the cloudy components may be precipitated while standing in the long term.

The content of titanium derived from the solid titanium-containing compound (a) in this titanium-containing solution is usually in the range of 500 to 100,000 ppm, preferably 3,000 to 100,000 ppm, and more preferably 5,000 to 50,000 ppm.

In the present invention, the titanium content in the titanium-containing solution can be measured, for example, by ICP analysis.

If the content of titanium derived from the solid titanium-containing compound (a) in this titanium-containing solution is within the above range, the amount of solvent which is added to the polymerization reactor when catalyst is added to the polymerization reactor is not much to affect polymerization, and further, dissolution of the solid titanium-containing compound (a) into the reaction system is not hard.

Water content in the titanium-containing solution, is preferably in the range of 0.05 to 15.0% by weight, and more preferably 0.05 to 10% by weight. If the water content of titanium-containing solution is within the above range, preferably the solubility is good, and the storage stability is also good.

Method for Producing a Polyester Resin

In the method for producing a polyester resin of the present invention, aromatic dicarboxylic acid or an ester-forming derivative thereof and aliphatic diol or an ester-forming derivative thereof are subjected to polycondensation under presence of the above-described catalyst for polyester production, to produce the polyester resin. Hereinafter, one example of the method will be explained.

(Raw Materials Used)

In the method for producing a polyester resin according to the present invention, aromatic dicarboxylic acid or an ester-forming derivative thereof and aliphatic diol or an ester-forming derivative thereof are used as raw materials.

The aromatic dicarboxylic acid which is used in the present invention includes aromatic dicarboxylic acid such as terephthalic acid, phthalic acid, isophthalic acid, naphthalene dicarboxylic acid, diphenyl dicarboxylic acid, diphenoxyethane dicarboxylic acid and the like.

The aliphatic diol includes aliphatic glycol such as ethylene glycol, trimethylene glycol, propylene glycol, tetramethylene glycol, neopentyl glycol, hexamethylene glycol, dodecamethylene glycol and the like.

In the present invention, aliphatic dicarboxylic acid such as adipic acid, sebacic acid, azelainic acid, decane dicarboxylic acid and the like, alicyclic dicarboxylic acid such as cyclohexane dicarboxylic acid, and the like can be further used as a raw material with the aromatic dicarboxylic acid. In addition, alicyclic glycol such as cyclohexane dimethanol and the like, aromatic diol such as bisphenol, hydroquinone, 2,2-bis(4-β-hydroxyethoxyphenyl)propanes and the like can be further used as a raw material with the aliphatic diol.

Further, polyfunctional compound such as trimesinic acid, trimethylol ethane, trimethylol propane, trimethylol methane, pentaerythritol and the like can be used as a raw material in the present invention.

(Esterification Process)

First, aromatic dicarboxylic acid or an ester-forming derivative thereof and aliphatic diol or an ester-forming derivative thereof are subjected to esterification to produce a polyester resin.

Specifically, a slurry including aromatic dicarboxylic acid or an ester-forming derivative thereof and aliphatic diol or an ester-forming derivative thereof is prepared.

In such slurry, usually 1.005 to 1.4 mole, and preferably 1.01 to 1.3 mole of aliphatic diol or an ester-forming derivative thereof is contained, relative to 1 mole of aromatic dicarboxylic acid or an ester-forming derivative thereof. This slurry is continuously provided to the esterification process.

Esterification is preferably carried out using a device in which at least 2 reactive group for esterification are serially connected under the condition of ethylene glycol reflux, with removing water produced by the reaction to the outside of the distillation tower.

Esterification process is conducted usually in multiple steps. The first step of the esterification is carried out under the condition that the reaction temperature is usually 240 to 270° C., and preferably 245 to 265° C., and the pressure is 0.02 to 0.3 MPaG (0.2 to 3 kg/cm² G), and preferably 0.05 to 0.2 MPaG (0.5 to 2 kg/cm² G). The last step of the esterification is carried out under the condition that the reaction temperature is usually 250 to 280° C., and preferably 255 to 275° C. and the pressure is 0 to 0.15 MPaG (0 to 1.5 kg/cm² G), and preferably 0 to 0.13 MPaG (0 to 1.3 kg/cm² G).

If the esterification is conducted in two steps, the esterification conditions of the first step and the second step are in the above-described ranges, respectively. If the esterification is conducted in three or more steps, the esterification conditions in the second step to the preceding step of the last step may be a condition between the reaction condition of the first step and the reaction condition of the last step.

For example, if the esterification is conducted in 3 steps, the reaction temperature of the second step of esterification is usually 245 to 275° C., and preferably 250 to 270° C., and the pressure is usually 0 to 0.2 MPaG (0 to 2 kg/cm² G), and preferably 0.02 to 0.15 MPaG (0.2 to 1.5 kg/cm² G).

The esterification rate in each step is not specially limited, but it is preferred that the degree of increase of esterification rate in each step is distributed smoothly. For the esterification product of the last step, usually 90% or more, and preferably 93% or more of esterification rate is desired to be achieved.

By this esterification process, the esterification product (low molecular condensate) of aromatic dicarboxylic acid and aliphatic diol is obtained, and number-average molecular weight of this low molecular condensate is approximately 500 to 5,000.

The low molecular condensate obtained by the above-described esterification process is provided to the next polycondensation (liquid polycondensation) process.

(Liquid Polycondensation Process)

In the liquid polycondensation process, the low molecular condensate obtained in the esterification process under presence of the catalyst for polyester production, is subjected to polycondensation by heating at the temperature of the melting point of the polyester resin or higher (usually 250 to 280° C.) under reduced pressure. In this polycondensation reaction, the reaction is preferably carried out with distilling off the unreacted aliphatic diol out of the reaction system.

The polycondensation reaction may be conducted in one step or in multiple steps. For example, when polycondensation reaction is carried out in multiple steps, the first step of polycondensation reaction is carried out under the condition that the reaction temperature is 250 to 290° C., and preferably 260 to 280° C., and the pressure is 0.07 to 0.003 MPaG (500 to 20 Torr), and preferably 0.03 to 0.004 MPaG (200 to 30 Torr), and the last step of polycondensation reaction is carried out under the condition that the reaction temperature is 265 to 300° C., and preferably 270 to 295° C. and the pressure is 1 to 0.01 kPaG (10 to 0.1 Torr), and preferably 0.7 to 0.07 kPaG (5 to 0.5 Torr).

If the polycondensation is conducted in three or more steps, polycondensation in the second step to the preceding step of the last step may be conducted under the condition between the reaction condition of the first step and the reaction condition of the last step. For example, if the polycondensation is conducted in 3 steps, the second step of polycondensation is conducted under the condition that the reaction temperature of is usually 260 to 295° C., and preferably 270 to 285° C. and the pressure is 7 to 0.3 kPaG (50 to 2 Torr), and preferably 5 to 0.7 kPaG (40 to 5 Torr).

In the polycondensation reaction, the solid titanium-containing compound (a) or the titanium-containing solution is desirably used in an amount of 0.001 to 0.2 mole %, and preferably 0.002 to 0.1 mole %, relative to aromatic dicarboxylic acid unit in the low molecular condensate in terms of converted metal atom.

If the compound (II) is further used in addition to the solid titanium-containing compound (a) or the titanium-containing solution, the compound (II) is used in an amount of 0.001 to 0.5 mole %, and preferably 0.002 to 0.3 mole %, relative to aromatic dicarboxylic acid unit in low molecular condensate in terms of converted metal atom.

In addition, if alkali metal compound (b) is further used in addition to the solid titanium-containing compound (a) or the titanium-containing solution, the alkali metal compound (b) is used in an amount of 0.001 to 0.5 mole %, and preferably 0.002 to 0.3 mole %, relative to aromatic dicarboxylic acid unit in low molecular condensate in terms of converted alkali metal atom.

A catalyst comprising at least one kind of solution selected from the solid titanium-containing compound (a) or the titanium-containing solution and, optionally the compound (II) and/or the alkali metal compound (b) may be present in the polycondensation reaction. For this, the catalyst may be added in any processes of the process for preparing a slurry which is a raw material, the esterification process, the liquid polycondensation process and the like. In addition, the catalyst may be added at one time in whole amount or may be added multiple times in divided amounts. In addition, if the compound (II) and/or the alkali metal compound (b) is(are) combined, it(they) may be added in the same process or in a separate process with the solid titanium-containing compound (a) or the titanium-containing solution.

In addition, the polycondensation reaction is preferably carried out under coexistence of a stabilizer.

The stabilizer specifically includes phosphorus compound such as phosphoric acid esters such as trimethyl phosphate, triethyl phosphate, tri-n-butyl phosphate, trioctyl phosphate, triphenyl phosphate and the like; phosphorous acid esters such as triphenyl phosphite, trisdodecyl phosphite, trisnonylphenyl phosphate and the like; phosphoric acid ester and phosphoric acid such as methylacid phosphate, ethylacid phosphate, isopropylacid phosphate, butylacid phosphate, dibutyl phosphate, monobutyl phosphate, dioctyl phosphate and the like; polyphosphoric acid, and the like.

Such phosphorus compound may be added in an amount of 0.005 to 0.2 mole %, and preferably 0.01 to 0.1 mole %, relative to aromatic dicarboxylic acid in terms of converted phosphorus atom in the corresponding phosphorus compound.

The intrinsic viscosity [IV] of the polyester resin obtained in the liquid polycondensation process as described above is 0.40 to 1.0 dl/g, and preferably 0.50 to 0.90 dl/g. Further, intrinsic viscosity to be achieved in each step of the liquid polycondensation process except the last step is not specially limited, but it is preferred that the degree of increase of intrinsic viscosity in each step is distributed smoothly.

Further, in the present specification, intrinsic viscosity [IV] is calculated by dissolving 1.2 g of the polyester resin in 15 cc of o-chlorophenol under heating, and then cooling the solution and measuring the solution viscosity at 25 C.

The polyester resin obtained in the polycondensation process is usually molded to particulates (chip shape) by melt extrusion molding.

(Solid Polycondensation Process)

The polyester resin obtained in the liquid polycondensation process can be further subjected to solid polycondensation, if desired.

The particulate polyester resin to be provided to the solid polycondensation process may be preliminarily subject to precrystallization by heating at a temperature lower than the temperature of the solid polycondensation, before provided to the solid polycondensation process.

Such precrystallization process can be carried out by heating the particulate polyester resin in dried state at a temperature of usually 120 to 200° C. and preferably 130 to 180° C. for 1 minute to 4 hours. In addition, such precrystallization can be also carried out by heating the particulate polyester resin at a temperature of 120 to 200° C. for at least 1 minute under water vapor atmosphere, under water vapor-containing inert gas atmosphere, or under water vapor-containing air atmosphere.

The degree of crystallization of the precrystallized polyester resin is preferably 20 to 50%.

Further, so-called solid polycondensation reaction of the polyester resin does not proceed by this precrystallization treatment, and the intrinsic viscosity of the precrystallized polyester resin is almost the same as the intrinsic viscosity of the polyester resin after the liquid polycondensation. Difference between the intrinsic viscosity of the precrystallized polyester resin and the intrinsic viscosity of the polyester resin before the precrystallization is usually 0.06 dl/g or less.

The solid polycondensation process comprises at least 1 step, and is conducted under inert gas atmosphere of nitrogen, argon, carbon dioxide and the like, under the condition that the temperature is 190 to 230° C., and preferably 195 to 225° C., and the pressure is 98 to 0.001 MPaG (1 kg/cm$^2$ G to 10 Torr), and preferably atmospheric pressure to 0.01 MPaG (100 Torr). The inert gas to be used is desirably nitrogen gas.

The particulate polyester resin obtained by such solid polycondensation process may be treated with water, for example, by the method as described in Japanese Examined Patent Application Publication No. 7-64920. This water treatment is conducted by contacting the particulate polyester resin with water, water vapor, water vapor-containing inert gas, water vapor-containing air and the like.

It is desired that the intrinsic viscosity of thus obtained particulate polyester resin is usually 0.60 dl/g or more, preferably 0.60 to 1.00 dl/g, and more preferably 0.75 to 0.95 dl/g.

The process for producing the polyester resin comprising the above-described esterification process and the polycondensation process can be carried out by any one of batch type, semi-continuation type or continuation type.

The catalyst for polyester production according to the present invention, in particular, the catalyst comprising the solid titanium-containing compound (a) or the titanium-containing solution and the compound (II) wherein the compound (II) is a magnesium compound, is suitable as a catalyst for producing polyethylene terephthalate. In producing polyethylene terephthalate with the catalyst comprising the solid titanium-containing compound (a) or the titanium-containing solution and the magnesium compound, esterification, liquid polycondensation and, if desired, solid polycondensation are conducted as described above using, for example, terephthalic acid or an ester-forming derivative thereof, ethylene glycol or an ester-forming derivative thereof, and if necessary, aromatic dicarboxylic acid other than terephthalic acid and/or aliphatic diol other than ethylene glycol as raw materials.

In this regard, terephthalic acid or an ester-forming derivative thereof is used in an amount of at least 80 mole %, and preferably at least 90 mole %, relative to 100 mole % of aromatic dicarboxylic acid, ethylene glycol or an ester-forming derivative thereof is used in an amount of at least 80 mole %, and preferably at least 90 mole %, relative to 100 mole % of aliphatic diol.

The titanium content of thus obtained polyethylene terephthalate is preferably in the range of 1 to 200 ppm, and particularly 1 to 50 ppm, and magnesium content is preferably in the range of 1 to 200 ppm, and particularly 1 to 100 ppm. In addition, it is desired that the weight ratio of titanium and magnesium contained in the polyethylene terephthalate (Mg/Ti) is in the range of 0.01 or more, preferably 0.06 to 10, and particularly preferably 0.06 to 5. Further, the chlorine content of the polyethylene terephthalate is in the range of 0 to 1,000 ppm, and preferably 0 to 100 ppm.

Such polyethylene terephthalate has excellent hue and in particular excellent transparency, and has low acetaldehyde content, so it is particularly preferably used as a hollow molded container.

By using the catalyst for polyester production according to the present invention, a polyester resin can be produced at comparable or more production rate as compared with the polyester resin produced by using the antimony compound or germanium compound that is currently used in the industry as shown in Formula (A-1) as above.

The polyester resin produced by using the catalyst for polyester production according to the present invention has comparable or less amount of increase in the acetaldehyde at the time of molding as compared with that of the polyester resin produced by using the antimony compound or germanium compound that is currently used in the industry as shown in Formula (B-1). In other words, by using the polyester resin according to the present invention, a beverage packaging container can be produced in comparable or better quality as compared with that obtained by using the antimony compound or germanium compound.

By using the catalyst for polyester production according to the present invention, the metal content in the polyester resin can decrease to 50 ppm or less as shown in Formula (C-1), and therefore a polyester resin which has comparable or better environment safety as compared with the polyester resin produced by using the existing antimony compound or germanium compound, is produced. It is preferred that the catalyst for polyester production according to the present invention substantially comprises no antimony compound and germanium compound as a polycondensation catalyst.

Thus produced polyester resin may contain conventionally well-known additives, for example, a stabilizer, a mold release agent, an antistatic agent, a dispersing agent, a coloring agent such as a pigment and a dye, and the like. These additives may be added in any steps in the polyester production, or may be added by master-batch before molding process.

The polyester resin obtained by the present invention can be used as a material for various molded bodies, for example, hollow molded bodies such as a hollow molded container by melt-molding, sheets, films, fibers and the like, and preferably for a hollow molded container.

For a method for molding a hollow molded container, sheets, films, fibers and the like from the polyester resin, and particularly the polyethylene terephthalate obtained by the present invention, any conventionally well-known methods can be employed.

For example, a hollow molded container may be produced by a method for producing a hollow molded article in which the polyester resin is extruded in the melt state by a die to form a parison in tube form, then the parison is maintained in a mold of desired shape, air is blown, and it is introduced to a mold; a method for producing a hollow molded article in which the polyester resin is injection-molded to produce a preform, the preform is heated to suitable extension temperature, then the preform is maintained in a mold of desired shape, air is blown, and it is introduced to a mold; and the like.

EXAMPLES

Hereinafter, the present invention will be explained by the following Examples, which are not intended to limit the present invention.

Reference Example 1

Into a 1,000-ml glass beaker was put 500 ml of deionized water, the beaker was cooled in an ice bath, and 5 g of titanium tetrachloride was added dropwise with stirring. When hydrochloride stopped to occur, the solution was taken out of the ice bath, 25% ammonia water was added dropwise at room temperature with stirring, and the pH of the solution was adjusted to 9. To this solution was added dropwise 15% aqueous acetate solution at room temperature with stirring, and the pH of the solution was adjusted to 5. The produced precipitate was isolated by filtration. The precipitate was washed five times with deionized water. The precipitate after washing was soaked in water containing 20% by weight of ethylene glycol for 30 minutes, and solid-liquid separation was conducted by filtration in the same manner as at the time of washing. Titanium compound after washing was dried under reduced pressure (40° C., 1.3 kPa (10 Torr), 20 hours) to remove moisture, to give a solid hydrolysate (a solid titanium-containing compound). The obtained solid titanium-containing compound was milled into particles of approximately 10 to 20 μm before dissolving in ethylene glycol.

The metal titanium content in the solid titanium-containing compound as measured by ICP analysis was 35.4% by weight.

The fact that the solid titanium-containing compound contains titanium, oxygen, carbon and hydrogen and has Ti—O—C bond, was confirmed by element analysis, EXAFS analysis and $^{13}$C-NMR analysis. In addition, the maximum solubility of the solid titanium-containing compound in ethylene glycol was 3,000 ppm, the carbon content was 11.8% by weight, and the weight ratio of titanium and carbon (Ti/C) was 3.

Then, into a 200-ml glass flask was put 100 g of ethylene glycol, and to the flask was added 0.34 g of the solid titanium-containing compound. The mixture was dissolved by heating at 150° C. for 1 hour, to give a titanium-containing solution. The titanium content in the titanium-containing solution as measured by ICP analysis was 0.12% by weight. In addition, HAZE value of this solution as measured by hazemeter (Nippondenshoku Co., Ltd., ND-10001DP) was 1.5%.

Reference Example 2

Into a 1,000-ml glass beaker was put 500 ml of deionized water, the beaker was cooled in an ice bath, and 5 g of titanium tetrachloride was added dropwise with stirring. When hydrochloride stopped to occur, the solution was taken out of the ice bath, 25% ammonia water was added dropwise at room temperature with stirring, and the pH of the solution was adjusted to 9. To this solution was added dropwise 15% aqueous acetate solution at room temperature with stirring, and the pH of the solution was adjusted to 5. The produced precipitate was isolated by filtration. The precipitate after washing was maintained as a slurry of 2.0% by weight slurry concentration, in water containing 30% by weight ethylene glycol for 30 minutes. Granulating and drying were carried out using a spray drier of dual fluid nozzle type at a temperature of 90° C., to give a solid hydrolysate (a solid titanium-containing compound).

Particle size distribution of the obtained solid titanium-containing compound was 0.5 to 20 μm, and the mean particle diameter was 1.8 μm.

The metal titanium content in the solid titanium-containing compound as measured in the same manner as in Reference Example 1 was 34.8 was % by weight.

The fact that the solid titanium-containing compound contains titanium, oxygen, carbon and hydrogen and has Ti—O—C bond, was confirmed by element analysis, EXAFS analysis and $^{13}$C-NMR analysis. In addition, the maximum solubility of the solid hydrolysate in ethylene glycol was 3,000 ppm, the carbon content was 11.6% by weight, and the weight ratio of titanium and carbon (Ti/C) was 3.

Then, into a 300-ml glass flask were put 170 g of ethylene glycol and 30 g of glycerin, and to the flask was added 5.75 g of the solid titanium-containing compound. The mixture was dissolved by heating at 170° C. for 2 hours, to give a titanium-containing solution. The titanium content in the titanium-containing solution as measured by ICP analysis was 1.0% by weight, and HAZE value as measured in the same manner as in Reference Example 1 was 1.3%.

Reference Example 3

Into a 2,000-ml glass flask was put 1000 ml of deionized water, and 8.7 g of zinc acetate dihydrate was dissolved in the water. Subsequently, 66 g of 5% aqueous solution of sodium hydroxide was added, and the pH was adjusted to 11. Thus produced precipitate was isolated by filtration, and washed five times with deionized water. 9 g of thus obtained precipitate and, 78 g of the precipitate of the titanium compound after washing, prepared by the same formulation as in Example 1 (titanium content: 5.4% by weight), were mixed. The mixture was soaked in water containing 20% by weight of ethylene glycol for 30 minutes, and solid-liquid separation was conducted by filtration in the same manner as at the time of washing. The precipitate after washing was dried under reduced pressure (40° C., 1.3 kPa (10 Torr), 20 hours) to remove moisture, to give a solid hydrolysate (a solid titanium-containing compound). The obtained solid titanium-containing compound was milled into particles of approximately 10 to 20 μm before dissolving in ethylene glycol.

The titanium content in the solid titanium-containing compound as measured by ICP analysis was 30.2% by weight, and the zinc content was 16.8% by weight.

The fact that the solid titanium-containing compound contains titanium, oxygen, carbon and hydrogen and has Ti—C—C bond, was confirmed by element analysis, EXAFS analysis and 13C-NMR analysis. In addition, the maximum solubility of the solid hydrolysate in ethylene glycol was 3,000 ppm, the carbon content was 10.1% by weight, and the weight ratio of titanium and carbon (Ti/C) was 3.

Then, into a 200-ml glass flask was put 100 g of ethylene glycol, and to the flask was added 0.5 g of p-toluene sulfonic acid, and then was added 0.38 g of the solid titanium-containing compound. The mixture was dissolved by heating at 150° C. for 1 hour, to give a titanium-containing solution. The titanium content in the obtained titanium-containing solution as measured by ICP analysis was 0.12% by weight, and HAZE value as measured in the same manner as in Reference Example 1 was 5.2%.

Reference Example 4

Into a 1,000-ml glass beaker was put 500 ml of deionized water, and 0.15 g of magnesium hydroxide anhydride was added and dispersed. The beaker was cooled in an ice bath, and 5 g of titanium tetrachloride was added dropwise with stirring. The solution was acidified during the dropping, and the dispersed magnesium hydroxide was dissolved. When hydrochloride stopped to occur, the solution was taken out of the ice bath, 25% ammonia water was added dropwise at room temperature with stirring, and the pH of the solution was adjusted to 9. To this solution was added dropwise 15% aqueous acetate solution at room temperature with stirring, and the pH of the solution was adjusted to 5. The produced precipitate of hydrolysate was isolated by filtration. This precipitate was washed five times with deionized water. The precipitate after washing was soaked in water containing 10% by weight of ethylene glycol for 30 minutes, and solid-liquid separation was conducted by filtration in the same manner as at the time of washing. The hydrolysate after washing was dried under reduced pressure (40° C., 1.3 kPa (10 Torr), 20 hours) to remove moisture, to give a solid hydrolysate (a solid titanium-containing compound). The obtained solid titanium-containing compound was milled into particles of approximately 10 to 20 μm before being used as a polycondensation catalyst.

The metal titanium content in the solid titanium-containing compound as measured by ICP analysis was 33.4% by weight, and metal magnesium content was 3.2% by weight.

The fact that the solid titanium-containing compound contains titanium, oxygen, carbon and hydrogen and has Ti—O—C bond, was confirmed by element analysis, EXAFS analysis and $^{13}$C-NMR analysis. In addition, the maximum solubility of the solid hydrolysate in ethylene glycol was 3,000 ppm, the carbon content was 11.1% by weight, and the weight ratio of titanium and carbon (Ti/C) was 3.

Then, into a 200-ml glass flask was put 100 g of ethylene glycol, and to the flask was add 0.5 g of p-toluene sulfonic acid, and then 0.36 g of the solid titanium-containing compound. The mixture was dissolved by heating at 150° C. for 1 hour, to give a titanium-containing solution. The titanium content in the titanium-containing solution as measured by ICP analysis was 0.12% by weight, and HAZE value as measured in the same manner as in Reference Example 1 was 5.4%.

Preparative Example 1

Into a 200-ml glass flask was put 100 g of ethylene glycol, and to the flask was added 1.74 g of sodium hydroxide, and the mixture was dissolved by heating at 100° C. for 30 minutes.

Preparative Example 2

Into a 200-ml glass flask was put 100 g of ethylene glycol, and to the flask was added 1.43 g of potassium hydroxide, and the mixture was dissolved by heating at 100° C. for 30 minutes.

Preparative Example 3

Into a 200-ml glass flask was put 100 g of ethylene glycol, and to the flask was added 2.35 g of sodium methoxide, and the mixture was dissolved by heating at 100° C. for 30 minutes.

Preparative Example 4

Into a 200-ml glass flask was put 100 g of ethylene glycol, and to the flask was added 3.56 g of sodium acetate, and the mixture was dissolved by heating at 100° C. for 30 minutes.

Preparative Example 5

Into a 200-ml glass flask was put 100 g of ethylene glycol, and to the flask was added 9.65 g of sodium laurate, and the mixture was dissolved by heating at 100° C. for 30 minutes.

Preparative Example 6

Into a 200-ml glass flask was put 100 g of ethylene glycol, and to the flask was added 12.1 g of sodium palmitate, and the mixture was dissolved by heating at 100° C. for 30 minutes.

Preparative Example 7

Into a 200-ml glass flask was put 100 g of ethylene glycol, and to the flask was added 13.3 g of sodium stearate, and the mixture was dissolved by heating at 100° C. for 30 minutes.

Preparative Example 8

Into a 200-ml glass flask was put 100 g of ethylene glycol, and to the flask was added 4.87 g of sodium lactate, and the mixture was dissolved by heating at 100° C. for 30 minutes.

Preparative Example 9

Into a 200-ml glass flask was put 100 g of ethylene glycol, and to the flask was added 3.74 g of trisodium citrate, and the mixture was dissolved by heating at 100° C. for 30 minutes.

Preparative Example 10

Into a 200-ml glass flask was put 100 g of ethylene glycol, and to the flask was added 7.35 g of sodium glutamate, and the mixture was dissolved by heating at 100° C. for 30 minutes.

Example 1

Production of Polyester

Into a reactor having previously 33,500 parts by weight of reaction solution (in normal operation) was continuously fed a slurry which was prepared by mixing 6,458 parts by weight/hour of high purity terephthalic acid and 2,615 parts by weight/hour of ethylene glycol while maintaining the condition of nitrogen atmosphere, 260° C. and 0.9 kg/cm$^2$ G (0.09 MPaG) with stirring to conduct esterification. In this esterification, the mixed solution of water and ethylene glycol was distilled off.

The esterification product (low molecular condensate) was controlled to have 3.5 hours of mean retention hour, and continuously extracted out of the system.

Number-average molecular weight of the obtained low molecular condensate of ethylene glycol and terephthalic acid was 600 to 1,300 (trimer to pentamer).

Ethylene glycol solution of the titanium catalyst prepared in Reference Examples 1 to 4, and ethylene glycol solution of the alkali metal compound, or the alkali metal compound in the undissolved solid state prepared in Preparative Examples 1 to 10, were combined and used as shown in Table 1, to produce a polycondensation catalyst, and polycondensation reaction for the obtained low molecular condensate was conducted with the polycondensation catalyst.

Regarding the amount of each catalyst, the solution of Reference Examples 1 to 4 was added in an amount of 18 ppm in terms of converted titanium atom, relative to the produced polyethylene terephthalate. The solution of Preparative Examples 1 to 10 or solid alkali metal compound as alkali metal compound was added in an amount of 18 ppm of sodium and 30 ppm of potassium in terms of converted alkali metal, relative to the produced polyethylene terephthalate. Further, phosphoric acid was added in an amount of 6 ppm in terms of converted phosphorus atom, relative to the produced polyethylene terephthalate. The polycondensation was carried out under condition of 285° C. and 0.1 kPa (1 Torr). The time required for obtaining a liquid polymer product, polyethylene terephthalate which is a liquid polycondensation product, having an intrinsic viscosity of 0.64 dl/g was measured.

Then, the obtained polyethylene terephthalate which is a liquid polymer product, was subjected to precrystallization at 170° C. for 2 hours, and heated at 220° C. under nitrogen gas atmosphere so that intrinsic viscosity was elevated from 0.64 dl/g to 0.84 dl/g by elevating the molecular weight with the solid phase polymerization. The solid polycondensation time (h) required for the solid polycondensation was measured. The results are as shown in Table 1.

Molding of a Preform

Polyethylene terephthalate obtained by the solid phase polymerization was dried at 170° C. for 4 hours with a dehumidifying air dryer. Water content in the resin after drying was 40 ppm or less. The dried polyethylene terephthalate was molded with ASB-50 (manufactured by NISSEI ASB MACHINE CO., LTD.) at a cylinder temperature of 265 to 275° C. and 26±1 seconds of a molding cycle, to obtain a preform.

Measurement of Acetaldehyde Content

For the obtained polyethylene terephthalate which is a solid polymer product, and preform, the acetaldehyde content was measured by the following method, and the stability parameter of the polyester resin ($\Delta AA$) was calculated. The results are shown in Table 1.

The acetaldehyde content was measured with a gas chromatography (GC-6A, manufactured by SHIMADZU Corporation) for a supernatant which is obtained by freeze-milling 2.0 g of the sample with a freezer mill, putting the milled sample in to a nitrogen-flushed vial, further putting internal standard substance (acetone) and water, sealing the vial, and heating the vial at 120±2° C. for 1 hour with a dryer.

Comparative Example 1

Into a 1,000-ml glass beaker was put 500 ml of deionized water, the beaker was cooled in an ice bath, and 5 g of titanium tetrachloride was added dropwise with stirring. When hydrochloride stopped to occur, the solution was taken out of the ice bath, 25% ammonia water was added dropwise at room temperature with stirring, and the pH of the solution was adjusted to 9. To this solution was added dropwise 15% aqueous acetate solution at room temperature with stirring, and the pH of the solution was adjusted to 5. The produced precipitate was isolated by filtration. This precipitate was washed five times with deionized water. Solid-liquid separation after washing was conducted by filtration in the same manner. Titanium compound after washing was dried under reduced pressure (40° C., 10 Torr and 20 hours) to remove moisture, to give a hydrolysate.

The obtained solid hydrolysate was milled into particles of approximately 10 to 20 micron before dissolving in ethylene glycol.

The metal titanium content in the solid hydrolysate as measured in the same manner as in Reference Example 1 was 50.7% by weight.

The fact that the solid hydrolysate contains titanium, oxygen, carbon and hydrogen and has Ti—O—C bond, was confirmed by element analysis and EXAFS analysis. Further, the carbon content was 0.5% by weight. In addition, the maximum solubility of the solid titanium-containing compound in ethylene glycol was 500 ppm.

Into a 200-ml glass flask was put 120 g of ethylene glycol, and to the flask was added 2.36 g of the solid titanium-containing compound. The mixture was heated at 170° C. for 2 hours, but the solid titanium-containing compound did not dissolve.

Comparative Example 2

Polycondensation reaction was conducted in the same manner as in Example 1 except antimony acetate which is industrially used currently, was used as a catalyst. Antimony acetate was added in an amount of 160 ppm in terms of converted antimony atom, relative to the produced polyethylene terephthalate, and further phosphoric acid was added in an amount of 15 ppm in terms of converted phosphorus atom, relative to the produced polyethylene terephthalate.

Comparative Example 3

Polycondensation reaction was conducted in the same manner as in Comparative Example 2 except antimony acetate was added in an amount of 225 ppm in terms of converted antimony atom, relative to the produced polyethylene terephthalate.

Table 1 indicates the liquid polycondensation time, the solid polycondensation time, the total amount of the metal atoms contained in the polyester resin (M), the total amount of the heavy metal atoms contained in the polyester resin (HM), the value of polymerizability parameter ($V_{ssp}$), the intrinsic viscosity before solid polycondensation ($[AA]_0$), the intrinsic viscosity after solid polycondensation ($[AA]_1$) and difference between the acetaldehyde contents before and after molding ($\Delta AA$) in Example 1 and Comparative Examples 2 and 3.

TABLE 1

| | Catalyst Used | | Liquid Polycondensation Time (h) | Solid Polycondensation Time (h) | M (ppm) | HM (ppm) | $V_{ssp}$ (dl/g · h) | $[AA]_0$ (ppm) | $[AA]_1$ (ppm) | ΔAA (ppm) |
|---|---|---|---|---|---|---|---|---|---|---|
| | Ti | Alkali Metal | | | | | | | | |
| Example 1 | Reference Example 1 | Preparative Example 1 | 1.6 | 7.3 | 36 | 0 | 0.0274 | 1.0 | 6.3 | 5.3 |
| | | Preparative Example 2 | 1.8 | 7.9 | 48 | 0 | 0.0253 | 1.0 | 6.0 | 5.0 |
| | | Preparative Example 3 | 1.7 | 7.4 | 36 | 0 | 0.0270 | 1.0 | 6.2 | 5.2 |
| | | Preparative Example 4 | 1.4 | 7.5 | 36 | 0 | 0.0267 | 1.1 | 6.4 | 5.3 |
| | | Preparative Example 5 | 1.4 | 7.5 | 36 | 0 | 0.0267 | 1.1 | 6.3 | 5.2 |
| | | Preparative Example 6 | 1.4 | 7.3 | 36 | 0 | 0.0274 | 1.2 | 6.4 | 5.2 |
| | | Preparative Example 7 | 1.5 | 7.4 | 36 | 0 | 0.0270 | 1.1 | 6.3 | 5.2 |
| | | Preparative Example 8 | 1.5 | 7.2 | 36 | 0 | 0.0278 | 1.1 | 6.4 | 5.3 |
| | | Preparative Example 9 | 1.4 | 7.4 | 36 | 0 | 0.0270 | 1.2 | 6.4 | 5.2 |
| | | Preparative Example 10 | 1.5 | 7.5 | 36 | 0 | 0.0267 | 1.1 | 6.5 | 5.4 |
| | Reference Example 2 | Preparative Example 1 | 1.7 | 7.4 | 36 | 0 | 0.0270 | 1.2 | 6.2 | 5.0 |
| | | Preparative Example 2 | 1.8 | 7.9 | 48 | 0 | 0.0253 | 1.0 | 6.0 | 5.0 |
| | | Preparative Example 3 | 1.6 | 7.5 | 36 | 0 | 0.0267 | 1.1 | 6.3 | 5.2 |
| | | Preparative Example 4 | 1.5 | 7.6 | 36 | 0 | 0.0263 | 1.2 | 6.5 | 5.3 |
| | | Preparative Example 5 | 1.4 | 7.4 | 36 | 0 | 0.0270 | 1.1 | 6.4 | 5.3 |
| | | Preparative Example 6 | 1.5 | 7.3 | 36 | 0 | 0.0274 | 1.2 | 6.3 | 5.1 |
| | | Preparative Example 7 | 1.5 | 7.4 | 36 | 0 | 0.0270 | 1.1 | 6.3 | 5.2 |
| | | Preparative Example 8 | 1.4 | 7.3 | 36 | 0 | 0.0274 | 1.1 | 6.4 | 5.3 |
| | | Preparative Example 9 | 1.5 | 7.5 | 36 | 0 | 0.0267 | 1.1 | 6.4 | 5.3 |
| | | Preparative Example 10 | 1.5 | 7.6 | 36 | 0 | 0.0263 | 1.1 | 6.5 | 5.4 |
| | | Na Acetate | 1.6 | 7.6 | 36 | 0 | 0.0263 | 1.2 | 6.5 | 5.3 |
| | | Na Stearate | 1.5 | 7.4 | 36 | 0 | 0.0270 | 1.2 | 6.3 | 5.1 |
| | | Tri-Na Citrate | 1.5 | 7.5 | 36 | 0 | 0.0267 | 1.1 | 6.4 | 5.3 |
| | | Na Glutamate | 1.5 | 7.6 | 36 | 0 | 0.0263 | 1.1 | 6.5 | 5.4 |
| | Reference Example 3 | Preparative Example 1 | 1.5 | 7.0 | 46 | 10 | 0.0286 | 1.1 | 6.6 | 5.5 |
| | Reference Example 4 | Preparative Example 1 | 1.6 | 7.2 | 38 | 0 | 0.0278 | 1.1 | 6.5 | 5.4 |
| Comparative Example 2 | | Sb Acetate | 2.4 | 9.0 | 160 | 160 | 0.0222 | 1.1. | 7.0 | 5.9 |
| Comparative Example 3 | | Sb Acetate | 1.4 | 7.0 | 225 | 225 | 0.0286 | 1.2 | 8.0 | 6.8 |

Reference Example 5

Into a 200-ml glass flask was put 100 g of ethylene glycol, and to the flask was added and dissolved 1.74 g of sodium hydroxide. After dissolution, 2.83 g of the solid titanium-containing compound prepared in Reference Example 1 was added, and the he mixture was dissolved by heating at 120° C. for 30 minutes, to give a titanium-containing solution which is a catalyst for polyester production. Titanium content in the titanium-containing solution as measured by ICP analysis was 0.98% by weight, and HAZE value as measured in the same manner as in Reference Example 1 was 1.3%.

Reference Example 6

Into a 200-ml glass flask was put 100 g of ethylene glycol, and to the flask was added 5.80 g of 30% by weight aqueous solution of sodium hydroxide, and the contents were mixed. This mixture was heated at 120° C. to distill off 3.0 g of water. Then, 2.83 g of the solid titanium-containing compound prepared in Reference Example 1 was added, and the mixture was dissolved by heating at 125° C. for 30 minutes, to give a titanium-containing solution which is a catalyst for polyester production. The titanium content in the titanium-containing solution as measured by ICP analysis was 0.96% by weight, and HAZE value as measured in the same manner as in Reference Example 1 was 1.2%.

Reference Example 7

Into a 200-ml glass flask was put 100 g of ethylene glycol, and to the flask was added 5.80 g of 30% by weight aqueous solution of sodium hydroxide and the contents were mixed. 2.83g of the solid titanium-containing compound prepared in Reference Example 1 was added to this solution, and the mixture was dissolved by heating at 120° C. for 30 minutes, to give a titanium-containing solution which is a catalyst for polyester production. The titanium content in the titanium-containing solution as measured by ICP analysis was 0.93% by weight, and HAZE value as measured in the same manner as in Reference Example 1 was 1.1%.

Reference Example 8

Into a 200-ml glass flask was put 100 g of ethylene glycol, and to the flask was added and dissolved 2.35 g of sodium methoxide. After dissolution, 2.83 g of the solid titanium-containing compound prepared in Reference Example 1 was added, and the mixture was dissolved by heating at 125° C. for 30 minutes, to give a titanium-containing solution which is a catalyst for polyester production. The titanium content in the titanium-containing solution as measured by ICP analysis was 0.97% by weight, and HAZE value as measured in the same manner as in Reference Example 1 was 1.2%.

Reference Example 9

Into a 200-ml glass flask was put 100 g of ethylene glycol, and to the flask was added and dissolved 0.87 g of sodium hydroxide. After dissolution, 2.83 g of the solid titanium-containing compound prepared in Reference Example 1 was added, and the mixture was dissolved by heating at 120° C. for 30 minutes, to give a titanium-containing solution which is a catalyst for polyester production. The titanium content in the titanium-containing solution as measured by ICP analysis was 0.99% by weight, and HAZE value as measured in the same manner as in Reference Example 1 was 1.4%.

Reference Example 10

Into a 200-ml glass flask was put 100 g of ethylene glycol, and to the flask was added and dissolved 3.09 g of sodium hydroxide. After dissolution, 2.83 g of the solid titanium-containing compound prepared in Reference Example 1 was added, and the mixture was dissolved by heating at 120° C. for 30 minutes, to give a titanium-containing solution which is a catalyst for polyester production. The titanium content in the titanium-containing solution as measured by ICP analysis was 0.98% by weight, and HAZE value as measured in the same manner as in Reference Example 1 was 1.2%.

Reference Example 11

Into a 200-ml glass flask was put 100 g of ethylene glycol, and to the flask was added and dissolved 2.49 g of potassium hydroxide. After dissolution, 2.83 g of the solid titanium-containing compound prepared in Reference Example 1 was added, and the mixture was dissolved by heating at 120° C. for 30 minutes, to give a titanium-containing solution which is a catalyst for polyester production. The titanium content in the titanium-containing solution as measured by ICP analysis was 0.98% by weight, and HAZE value as measured in the same manner as in Reference Example 1 was 1.2%.

Reference Example 12

Into a 200-ml glass flask were put 102 g of ethylene glycol and 18 g of glycerin, and to the flask was added and dissolved 1.74 g of sodium hydroxide. After dissolution, 3.38 g of the solid titanium-containing compound prepared in Reference Example 1 was added, and the mixture was dissolved by heating at 120° C. for 30 minutes, to give a titanium-containing solution which is a catalyst for polyester production. The titanium content in the titanium-containing solution as measured by ICP analysis was 1.0% by weight, and HAZE value as measured in the same manner as in Reference Example 1 was 1.0%.

Reference Example 13

Into a 1,000-ml glass beaker was put 500 ml of deionized water, the beaker was cooled in an ice bath, and 5 g of titanium tetrachloride was added dropwise with stirring. When hydrochloride stopped to occur, the solution was taken out of the ice bath, 25% ammonia water was added dropwise at room temperature with stirring, and the pH of the solution was adjusted to 5. The produced precipitate was isolated by filtration. This precipitate was washed five times with deionized water. The precipitate after washing was soaked in water containing 20% by weight of ethylene glycol for 30 minutes, and solid-liquid separation was conducted by filtration in the same manner as at the time of washing. Titanium compound after washing was dried under reduced pressure (40° C., 1.3 kPa (10 Torr), 20 hours) to remove moisture, to give a solid hydrolysate (a solid titanium-containing compound).

Thus obtained solid titanium-containing compound was milled into particles of approximately 10 to 20 μm before dissolving in ethylene glycol.

The metal titanium content in the solid titanium-containing compound as measured in the same manner as in Reference Example 1 was 34.6% by weight.

The fact that the solid titanium-containing compound contains titanium, oxygen, carbon and hydrogen and has Ti—O—C bond, was confirmed by element analysis, EXAFS analysis and $^{13}$C-NMR analysis. In addition, the maximum solubility of the solid titanium-containing compound in ethylene glycol was 3,000 ppm, the carbon content was 11.5% by weight, and the weight ratio of titanium and carbon (Ti/C) was 3.

Then, into a 300-ml glass flask was put 200 g of ethylene glycol, and to the flask was added and dissolved 3.48 g of sodium hydroxide. After dissolution, 5.78 g of the solid titanium-containing compound was added, and the mixture was dissolved by heating at 120° C. for 30 minutes, to give a titanium-containing solution which is a catalyst for polyester production. The titanium content in the titanium-containing solution as measured by ICP analysis was 0.98% by weight. In addition, and HAZE value as measured in the same manner as in Reference Example 1 was 1.3%.

Reference Example 14

Into a 1,000-ml glass beaker was put 500 ml of deionized water, the beaker was cooled in an ice bath, 7.5 g of titanium tetraisopropoxide was added dropwise with stirring. After finishing the dropping, the mixture was stirred at room temperature for 30 minutes. After finishing the stirring, the produced precipitate was isolated by filtration. The precipitate was soaked in water containing 20% by weight of ethylene glycol for 30 minutes, and solid-liquid separation was conducted by filtration in the same manner as at the time of washing. Titanium compound after washing was dried under reduced pressure (40° C., 1.3 kPa (10 Torr), 20 hours) to remove moisture, to give a solid hydrolysate (a solid titanium-containing compound).

Thus obtained solid titanium-containing compound was milled into particles of approximately 10 to 20 μm before dissolving in ethylene glycol.

The metal titanium content in the solid titanium-containing compound as measured in the same manner as in Reference Example 1 was 36.3% by weight.

The fact that the solid titanium-containing compound contains titanium, oxygen, carbon and hydrogen and has Ti—O—C bond, was confirmed by element analysis, EXAFS analysis and $^{13}$C-NMR analysis. In addition, the maximum solubility of the solid titanium-containing compound in ethylene glycol was 3,000 ppm, the carbon content was 11.4% by weight, and the weight ratio of titanium and carbon (Ti/C) was 3.

Then, into a 300-ml glass flask was put 200 g of ethylene glycol, and to the flask was added and dissolved 3.48 g of sodium hydroxide. After dissolution, 5.51 g of the solid titanium-containing compound was added, and the mixture was dissolved by heating at 120° C. for 30 minutes, to give a titanium-containing solution which is a catalyst for polyester production. The titanium content in the titanium-containing solution as measured by ICP analysis was 0.98% by weight. In addition, HAZE value as measured in the same manner as in Example 1 was 1.2%.

Reference Example 15

Into a 300-ml glass flask was put 200 g of ethylene glycol, and to the flask was added and dissolved 3.48 g of sodium hydroxide. After dissolution, 5.75 g of the solid titanium-containing compound prepared in Reference Example 2 was added, and the mixture was dissolved by heating at 120° C. for 30 minutes, to give a titanium-containing solution which is a catalyst for polyester production. The titanium content in the titanium-containing solution as measured by ICP analysis was 0.98% by weight. In addition, and HAZE value as measured in the same manner as in Reference Example 1 was 1.3%.

Reference Example 16

Into a 300-ml glass flask was put 200 g of ethylene glycol, and to the flask was added and dissolved 3.48 g of sodium hydroxide. After dissolution, 6.62 g of the solid titanium-containing compound prepared in Reference Example 3 was added, and the mixture was dissolved by heating at 120° C. for 30 minutes, to give a titanium-containing solution which is a catalyst for polyester production. The titanium content in the titanium-containing solution as measured by ICP analysis was 0.98% by weight, and metal zinc content was 0.54% by weight. HAZE value as measured in the same manner as in Reference Example 1 was 2.0%.

Reference Example 17

Then, into a 300-ml glass flask was put 200 g of ethylene glycol, and to the flask was added and dissolved 3.48 g of sodium hydroxide. After dissolution, 5.99 g of the solid titanium-containing compound prepared in Reference Example 4 was added, and the mixture was dissolved by heating at 120° C. for 30 minutes, to give a titanium-containing solution which is a catalyst for polyester production. The titanium content in the titanium-containing solution as measured by ICP analysis was 0.98% by weight, and metal magnesium content was 0.09% by weight. HAZE value as measured in the same manner as in Reference Example 1 was 2.2%.

Reference Example 18

Into a 200-ml glass flask were put 102 g of ethylene glycol and 18 g of glycerin, and to the flask was added and dissolved 4.28 g of sodium acetate. After dissolution, 3.38 g of the solid titanium-containing compound prepared in Reference Example 1 was added to the flask, and the mixture was dissolved by heating at 120° C. for 30 minutes, to give a titanium-containing solution. The metal titanium content in the titanium-containing solution as measured by ICP analysis was 1.0% by weight, and HAZE value as measured in the same manner as in Reference Example 1 was 1.1%.

Reference Example 19

Into a 200-ml glass flask were put 102 g of ethylene glycol and 18 g of glycerin, and to the flask was added and dissolved 11.6 g of sodium laurate. After dissolution, 3.38 g of the solid titanium-containing compound prepared in Reference Example 1 was added, and the mixture was dissolved by heating at 120° C. for 30 minutes, to give a titanium-containing solution. The metal titanium content in the titanium-containing solution as measured by ICP analysis was 0.99% by weight, and HAZE value as measured in the same manner as in Reference Example 1 was 1.2%.

Reference Example 20

Into a 200-ml glass flask were put 102 g of ethylene glycol and 18 g of glycerin, and to the flask was added and dissolved 14.5 g of sodium palmitate. After dissolution, 3.38 g of the solid titanium-containing compound prepared in Reference Example 1 was added, and the mixture was dissolved by heating at 120° C. for 30 minutes, to give a titanium-containing solution. The metal titanium content in the titanium-containing solution as measured by ICP analysis was 1.01% by weight, and HAZE value as measured in the same manner as in Reference Example 1 was 1.2%.

Reference Example 21

Into a 200-ml glass flask were put 102 g of ethylene glycol and 18 g of glycerin, and to the flask was added and dissolved 16.0 g of sodium stearate. After dissolution, 3.38 g of the solid titanium-containing compound prepared in Reference Example 1 was added, and the mixture was dissolved by heating at 120° C. for 30 minutes, to give a titanium-containing solution. The metal titanium content in the titanium-containing solution as measured by ICP analysis was 0.98% by weight, and HAZE value as measured in the same manner as in Reference Example 1 was 1.2%.

Reference Example 22

Into a 200-ml glass flask were put 102 g of ethylene glycol and 18 g of glycerin, and to the flask was added and dissolved 5.79 g of sodium lactate. After dissolution, 3.38 g of the solid titanium-containing compound prepared in Reference Example 1 was added, and the mixture was dissolved by heating at 120° C. for 30 minutes, to give a titanium-containing solution. The metal titanium content in the titanium-containing solution as measured by ICP analysis was 1.0% by weight, and HAZE value as measured in the same manner as in Reference Example 1 was 1.3%.

Reference Example 23

Into a 200-ml glass flask were put 102 g of ethylene glycol and 18 g of glycerin, and to the flask was added and dissolved 4.48 g of trisodium citrate. After dissolution, 3.38 g of the solid titanium-containing compound prepared in Reference Example 1 was added, and the mixture was dissolved by heating at 120° C. for 30 minutes, to give a titanium-containing solution. The metal titanium content in the titanium-containing solution as measured by ICP analysis was 1.01% by weight, and HAZE value as measured in the same manner as in Reference Example 1 was 1.2%.

Reference Example 24

Into a 200-ml glass flask were put 102 g of ethylene glycol and 18 g of glycerin, and to the flask was added and dissolved 9.80 g of sodium glutamate. After dissolution, 3.38 g of the solid titanium-containing compound prepared in Reference Example 1 was added, and the mixture was dissolved by heating at 120° C. for 30 minutes, to give a titanium-containing solution. The metal titanium content in the titanium-containing solution as measured by ICP analysis was 1.0% by weight, and HAZE value as measured in the same manner as in Reference Example 1 was 1.1%.

Comparative Example 4

Into a 200-ml glass flask was put 100 g of ethylene glycol, and to the flask was added and dissolved 1.74 g of sodium hydroxide. After dissolution, 1.97 g of solid hydrolysate prepared in Comparative Example 1 was added. The mixture was heated at 140° C. for 3 hours, but the solid hydrolysate did not dissolve with no change in a cloudy state.

The metal titanium content in the slurry as measured by ICP analysis in the same manner was 1.01% by weight.

phosphorus atom, relative to the produced polyethylene terephthalate. The time required for obtaining polyethylene terephthalate which is a liquid polymer product, the solid polycondensation time (T), the acetaldehyde content in the solid phase polymerization product and the preform, and the stability parameter ($\Delta AA$) were measured in the same manner as in Example 1.

Table 2 indicates the liquid polycondensation time, the solid polycondensation time, and the values of M, HM, $V_{ssp}$, $[AA]_0$, $[AA]_1$ and $\Delta AA$ in Example 2 and Comparative Examples 4 and 5.

TABLE 2

| | Catalyst Used | Liquid Polycondensation Time (h) | Solid Polycondensation Time (h) | M (ppm) | HM (ppm) | $V_{ssp}$ (dl/g · h) | $[AA]_0$ (ppm) | $[AA]_1$ (ppm) | $\Delta AA$ (ppm) |
|---|---|---|---|---|---|---|---|---|---|
| Example 2 | Reference Example 5 | 1.5 | 7.4 | 36 | 0 | 0.0270 | 1.0 | 6.2 | 5.2 |
| | Reference Example 6 | 1.4 | 7.5 | 36 | 0 | 0.0267 | 1.2 | 6.3 | 5.1 |
| | Reference Example 7 | 1.5 | 7.7 | 36 | 0 | 0.0260 | 1.0 | 6.2 | 5.2 |
| | Reference Example 8 | 1.4 | 7.3 | 36 | 0 | 0.0274 | 1.2 | 6.4 | 5.2 |
| | Reference Example 9 | 1.3 | 7.2 | 27 | 0 | 0.0278 | 1.2 | 6.5 | 5.3 |
| | Reference Example 10 | 1.6 | 7.8 | 50 | 0 | 0.0256 | 1.0 | 5.8 | 4.8 |
| | Reference Example 11 | 1.5 | 7.7 | 48 | 0 | 0.0260 | 1.2 | 6.3 | 5.1 |
| | Reference Example 12 | 1.3 | 7.2 | 36 | 0 | 0.0278 | 1.1 | 6.3 | 5.2 |
| | Reference Example 13 | 1.5 | 7.5 | 36 | 0 | 0.0267 | 1.0 | 6.2 | 5.2 |
| | Reference Example 14 | 1.5 | 7.6 | 36 | 0 | 0.0263 | 1.2 | 6.4 | 5.2 |
| | Reference Example 15 | 1.4 | 7.4 | 36 | 0 | 0.0270 | 1.1 | 6.2 | 5.1 |
| | Reference Example 16 | 1.2 | 7.0 | 46 | 10 | 0.0286 | 1.2 | 6.7 | 5.5 |
| | Reference Example 17 | 1.3 | 7.3 | 38 | 0 | 0.0274 | 1.1 | 6.5 | 5.4 |
| | Reference Example 18 | 1.5 | 7.6 | 36 | 0 | 0.0263 | 1.3 | 6.7 | 5.4 |
| | Reference Example 19 | 1.4 | 7.3 | 36 | 0 | 0.0274 | 1.1 | 6.5 | 5.4 |
| | Reference Example 20 | 1.4 | 7.4 | 36 | 0 | 0.0270 | 1.2 | 6.3 | 5.1 |
| | Reference Example 21 | 1.4 | 7.3 | 36 | 0 | 0.0274 | 1.2 | 6.4 | 5.2 |
| | Reference Example 22 | 1.4 | 7.4 | 36 | 0 | 0.0270 | 1.1 | 6.6 | 5.5 |
| | Reference Example 23 | 1.4 | 7.5 | 36 | 0 | 0.0267 | 1.3 | 6.7 | 5.4 |
| | Reference Example 24 | 1.4 | 7.3 | 36 | 0 | 0.0274 | 1.1 | 6.5 | 5.1 |
| Comparative Example 4 | Comparative Example 4 | 2.0 | 10.5 | 36 | 0 | 0.0190 | 1.1 | 6.0 | 4.9 |
| Comparative Example 5 | Comparative Example 5 | 1.3 | 8.2 | 18 | 0 | 0.0244 | 1.2 | 10.0 | 8.8 |

Comparative Example 5

Into a 200-ml glass flask were put 102 g of ethylene glycol and 18 g of glycerin, 3.38 g of solid hydrolysate prepared in Reference Example 1 was added, and the mixture was dissolved by heating at 170° C. for 2 hours, to give a solution which is a catalyst for polyester production. The metal titanium content in the solution as measured by ICP analysis was 1.0% by weight, and HAZE value as measured in the same manner as in Reference Example 1 was 2.0%.

Example 2

Production of Polyester

Polycondensation reaction for the low molecular condensate obtained in Example 1 was conducted with the titanium-containing solution or the ethylene glycol solution of titanium catalyst prepared in Reference Examples 5 to 24 and Comparative Examples 4 and 5 as a polycondensation catalyst.

Regarding the amount of each catalyst, the solution of Reference Examples 5 to 24 was added in an amount of 18 ppm in terms of converted titanium atom, relative to the produced polyethylene terephthalate, and further phosphoric acid was added in an amount of 6 ppm in terms of converted Reference Example 25

The same procedures were conducted as in Reference Example 5 except that the amount of sodium hydroxide used was 0.87 g, to give a titanium-containing solution which is a catalyst for polyester production. The titanium content in the titanium-containing solution as measured by ICP analysis was 0.98% by weight, and HAZE value as measured in the same manner as in Reference Example 1 was 1.5%.

Reference Example 26

The same procedures were conducted as in Reference Example 21 except that the amount of sodium stearate used was 8.0 g, to give a titanium-containing solution which is a catalyst for polyester production. The metal titanium content in the titanium-containing solution as measured by ICP analysis was 0.98% by weight, and HAZE value as measured in the same manner as in Reference Example 1 was 1.3%.

Preparative Example 11

Into a 200-ml glass flask was put 100 g of ethylene glycol, and to the flask was added 0.87 g of sodium hydroxide, and the mixture was dissolved by heating at 100° C. for 30 minutes.

Preparative Example 12

Into a 200-ml glass flask was put 100 g of ethylene glycol, and to the flask was added 0.71 g of potassium hydroxide added, and the mixture was dissolved by heating at 100° C. for 30 minutes.

Preparative Example 13

Into a 200-ml glass flask was put 100 g of ethylene glycol, and to the flask was added 1.78 9 of sodium acetate, and the mixture was dissolved by heating at 100° C. for 30 minutes.

Preparative Example 14

Into a 200-ml glass flask was put 100 g of ethylene glycol, and to the flask was added 6.6 g of sodium stearate, and the mixture was dissolved by heating at 100° C. for 30 minutes.

Preparative Example 15

Into a 200-ml glass flask was put 100 g of ethylene glycol, and to the flask was added 2.41 g of sodium lactate, and the mixture was dissolved by heating at 100° C. for 30 minutes.

Preparative Example 16

Into a 200-ml glass flask was put 100 g of ethylene glycol, and to the flask was added 1.87 g of trisodium citrate, and the mixture was dissolved by heating at 100° C. for 30 minutes.

Preparative Example 17

Into a 200-ml glass flask was put 100 g of ethylene glycol, and to the flask was added 3.67 g of sodium glutamate, and the mixture was dissolved by heating at 100° C. for 30 minutes.

Example 3

Production of Polyester

Polycondensation reaction for the low molecular condensate obtained in Example 1 was conducted with the titanium-containing solution prepared in Reference Examples 5, 12, 15, 21, 23, 25 and 26 and with the ethylene glycol solution of alkali metal or alkali metal compound in the undissolved solid state prepared in Preparative Examples 11 to 17, as a polycondensation catalyst in the combination as shown in Table 3.

Regarding the amount of each catalyst, the titanium-containing solution prepared in Reference Examples 5, 12, 15, 21, 23, 25 and 26 was added in an amount of 18 ppm in terms of converted titanium atom, relative to the produced polyethylene terephthalate, and further the ethylene glycol solution of alkali metal or alkali metal compound in the undissolved solid state prepared in Preparative Examples 11 to 17, was added in an amount of 9 ppm in terms of converted sodium, and 15 ppm in terms of converted potassium to the produced polyethylene terephthalate, and further phosphoric acid was added in an amount of 6 ppm in terms of converted phosphorus atom, relative to the produced polyethylene terephthalate. The time required for obtaining polyethylene terephthalate which is a liquid polymer product, the solid polycondensation time (T), the acetaldehyde content in the solid phase polymerization product and the preform, and the stability parameter ($\Delta AA$) were measured in the same manner as in Example 1.

Table 3 indicates the liquid polycondensation time, the solid polycondensation time, and the values of M, HM, $V_{ssp}$, $[AA]_0$, $[AA]_1$ and $\Delta AA$ in Example 3.

TABLE 3

| | Catalyst Used | | Liquid Polycondensation Time (h) | Solid Polycondensation Time (h) | M (ppm) | HM (ppm) | $V_{ssp}$ (dl/g · h) | $[AA]_0$ (ppm) | $[AA]_1$ (ppm) | $\Delta AA$ (ppm) |
|---|---|---|---|---|---|---|---|---|---|---|
| | Ti | Alkali Metal | | | | | | | | |
| Example 3 | Reference Example 5 | Preparative Example 11 | 1.6 | 7.8 | 45 | 0 | 0.0256 | 1.0 | 5.9 | 4.9 |
| | Reference Example 12 | | 1.4 | 7.3 | 45 | 0 | 0.0274 | 1.1 | 6.2 | 5.1 |
| | Reference Example 15 | | 1.6 | 7.7 | 45 | 0 | 0.0260 | 1.0 | 6.0 | 5.0 |
| | Reference Example 21 | | 1.6 | 7.6 | 45 | 0 | 0.0263 | 1.1 | 6.0 | 4.9 |
| | Reference Example 23 | | 1.6 | 7.7 | 45 | 0 | 0.0260 | 1.2 | 6.1 | 4.9 |
| | Reference Example 25 | | 1.3 | 7.2 | 36 | 0 | 0.0278 | 1.2 | 6.3 | 5.1 |
| | Reference Example 26 | | 1.3 | 7.1 | 36 | 0 | 0.0282 | 1.1 | 6.2 | 5.1 |
| | Reference Example 25 | Preparative Example 12 | 1.4 | 7.2 | 42 | 0 | 0.0278 | 1.0 | 6.2 | 5.2 |
| | | Preparative Example 13 | 1.5 | 7.6 | 36 | 0 | 0.0263 | 1.3 | 6.4 | 5.1 |
| | | Preparative Example 14 | 1.4 | 7.3 | 36 | 0 | 0.0274 | 1.1 | 6.3 | 5.2 |
| | | Preparative Example 15 | 1.4 | 7.2 | 36 | 0 | 0.0278 | 1.0 | 6.2 | 5.2 |
| | | Preparative Example 16 | 1.3 | 7.1 | 36 | 0 | 0.0282 | 1.1 | 6.4 | 5.3 |
| | | Preparative Example 17 | 1.4 | 7.3 | 36 | 0 | 0.0274 | 1.1 | 6.3 | 5.2 |
| | | Na Acetate | 1.5 | 7.5 | 36 | 0 | 0.0267 | 1.0 | 6.4 | 5.4 |
| | | Na Stearate | 1.4 | 7.2 | 36 | 0 | 0.0278 | 1.1 | 6.3 | 5.2 |
| | | Tri-Na Citrate | 1.3 | 7.1 | 36 | 0 | 0.0282 | 1.2 | 6.3 | 5.1 |
| | | Na Glutamate | 1.4 | 7.5 | 36 | 0 | 0.0267 | 1.1 | 6.4 | 5.3 |

Reference Example 27

Into a 1,000-ml glass beaker was put 500 ml of deionized water, the beaker was cooled in an ice bath, and 5 g of titanium tetrachloride was added dropwise with stirring. When hydrochloride stopped to occur, the solution was taken out of the ice bath, 25% ammonia water was added dropwise at room temperature with stirring, and the pH of the solution was adjusted to 9. To this solution was added dropwise 15% aqueous acetate solution at room temperature with stirring, and the pH of the solution was adjusted to 5. The produced precipitate was isolated by filtration. The precipitate after washing was maintained as a slurry of 2.0% by weight slurry concentration with ethylene glycol-containing aqueous solution of 30% by weight sodium hydroxide (1.0% by weight in terms of converted Na) which was prepared separately, for 30 minutes, and granulating and drying were carried out using a spray drier of dual fluid nozzle type at a temperature of 90° C., to give a solid hydrolysate (a solid titanium-containing compound).

Particle size distribution of the obtained solid titanium-containing compound was 0.5 to 20 μm, and the mean particle diameter was 1.8 μm.

The metal titanium content in the solid titanium-containing compound as measured in the same manner as in Reference Example 1 was 26.2% by weight, and the metal sodium content was 25.9% by weight.

The fact that the solid titanium-containing compound contains titanium, oxygen, carbon and hydrogen and has Ti—O—C bond, was confirmed by element analysis, EXAFS analysis and $^{13}$C-NMR analysis. In addition, the maximum solubility of the solid titanium-containing compound in ethylene glycol was more than 15,000 ppm, the carbon content was 9.7% by weight, and the weight ratio of titanium and carbon (Ti/C) was 2.7.

Then, into a 300-ml glass flask were put 170 g of ethylene glycol and 30 g of glycerin, and to the flask was added 7.63 g of the solid titanium-containing compound, and the mixture was dissolved by heating at 120° C. for 30 minutes, to give a titanium-containing solution. The titanium content in the titanium-containing solution as measured by ICP analysis was 1.0% by weight, the sodium content was 0.99% by weight, and HAZE value as measured in the same manner as in Reference Example 1 was 1.4%.

Reference Example 28

The same procedures were conducted as in Reference Example 27 except that the concentration of ethylene glycol-containing aqueous solution of 30% by weight sodium hydroxide was 0.5% by weight in terms of converted Na, to give a titanium-containing solution which is a catalyst for polyester production.

Particle size distribution of the obtained solid titanium-containing compound was 0.5 to 20 μm, and the mean particle diameter was 1.7 μm.

The metal titanium content in the solid titanium-containing compound as measured in the same manner as in Reference Example 1 was 30.1% by weight, and the metal sodium content was 14.9% by weight.

The fact that the solid titanium-containing compound contains titanium, oxygen, carbon and hydrogen and has Ti—O—C bond, was confirmed by element analysis, EXAFS analysis and $^{13}$C-NMR analysis. In addition, the maximum solubility of the solid titanium-containing compound in ethylene glycol was 15,000 ppm, the carbon content was 10.3% by weight, and the weight ratio of titanium and carbon (Ti/C) was 2.9.

Then, into a 300-ml glass flask were put 170 g of ethylene glycol and 30 g of glycerin, and to the flask was added 6.64 g of the solid titanium-containing compound, and the mixture was dissolved by heating at 120° C. for 30 minutes, to give a titanium-containing solution. The titanium content in the titanium-containing solution as measured by ICP analysis was 0.98% by weight, the sodium content was 0.49% by weight, and HAZE value as measured in the same manner as in Reference Example 1 was 1.5%.

Example 4

Production of Polyester

Polycondensation reaction for the low molecular condensate obtained in Example 1 was conducted with the titanium-containing solution prepared in Reference Examples 27 and 28 and with the ethylene glycol solution of alkali metal or alkali metal compound in the undissolved solid state prepared in Preparative Examples 11 to 17, as a polycondensation catalyst in the combination as shown in Table 3.

Regarding the amount of each catalyst, the titanium-containing solution prepared in Reference Examples 27 and 28 was added in an amount of 18 ppm in terms of converted titanium atom, relative to the produced polyethylene terephthalate, and further the ethylene glycol solution of alkali metal compound or alkali metal compound in the undissolved solid state prepared in Preparative Examples 11 to 17, was added in an amount of 9 ppm of sodium, and 15 ppm of potassium in terms of converted alkali metal, relative to the produced polyethylene terephthalate, and further phosphoric acid was added in an amount of 6 ppm in terms-of converted phosphorus atom, relative to the produced polyethylene terephthalate. The time required for obtaining polyethylene terephthalate which is a liquid polymer product, the solid polycondensation time (T), the acetaldehyde content in the solid phase polymerization product and the preform, and the stability parameter (ΔAA) were measured in the same manner as in Example 1.

Table 4 indicates the liquid polycondensation time, the solid polycondensation time, and the values of M, HM, $V_{ssp}$, $[AA]_0$, $[AA]_1$ and ΔAA in Example 4.

TABLE 4

| | Catalyst Used | | Liquid Polycondensation Time (h) | Solid Polycondensation Time (h) | M (ppm) | HM (ppm) | $V_{ssp}$ (dl/g · h) | $[AA]_0$ (ppm) | $[AA]_1$ (ppm) | ΔAA (ppm) |
|---|---|---|---|---|---|---|---|---|---|---|
| | Ti | Alkali Metal | | | | | | | | |
| Example 4 | Reference Example 27 | — | 1.5 | 7.3 | 36 | 0 | 0.0274 | 1.0 | 6.1 | 5.1 |
| | Reference Example 28 | — | 1.3 | 7.1 | 27 | 0 | 0.0282 | 1.2 | 6.7 | 5.5 |
| | Reference Example 27 | Preparative Example 11 | 1.7 | 7.9 | 45 | 0 | 0.0253 | 1.0 | 5.9 | 4.9 |

TABLE 4-continued

| | Catalyst Used | Liquid Polycondensation Time (h) | Solid Polycondensation Time (h) | M (ppm) | HM (ppm) | $V_{ssp}$ (dl/g · h) | $[AA]_0$ (ppm) | $[AA]_1$ (ppm) | ΔAA (ppm) |
|---|---|---|---|---|---|---|---|---|---|
| | Ti | Alkali Metal | | | | | | | |
| Reference Example 28 | Preparative Example 11 | 1.4 | 7.2 | 36 | 0 | 0.0278 | 1.1 | 6.2 | 5.1 |
| | Preparative Example 12 | 1.4 | 7.3 | 42 | 0 | 0.0274 | 1.0 | 6.2 | 5.2 |
| | Preparative Example 13 | 1.5 | 7.5 | 36 | 0 | 0.0267 | 1.1 | 6.3 | 5.2 |
| | Preparative Example 14 | 1.3 | 7.2 | 36 | 0 | 0.0278 | 1.2 | 6.2 | 5.0 |
| | Preparative Example 15 | 1.4 | 7.3 | 36 | 0 | 0.0274 | 1.1 | 6.3 | 5.2 |
| | Preparative Example 16 | 1.3 | 7.2 | 36 | 0 | 0.0278 | 1.1 | 6.4 | 5.3 |
| | Preparative Example 17 | 1.4 | 7.3 | 36 | 0 | 0.0274 | 1.1 | 6.3 | 5.2 |
| | Na Atetate | 1.4 | 7.4 | 36 | 0 | 0.0270 | 1.2 | 6.4 | 5.2 |
| | Na Stearate | 1.4 | 7.3 | 36 | 0 | 0.0274 | 1.0 | 6.3 | 5.3 |
| | Tri-Na Citrate | 1.3 | 7.2 | 36 | 0 | 0.0278 | 1.1 | 6.4 | 5.3 |
| | Na Glutamate | 1.4 | 7.5 | 36 | 0 | 0.0267 | 1.1 | 6.5 | 5.4 |

INDUSTRIAL APPLICABILITY

The polyester resin of the present invention has high productivity, stability and safety. By using the catalyst for polyester production according to the present invention as a polycondensation catalyst, a polyester resin can be prepared having high catalytic activity, high stability and low the metal content as compared with the conventional germanium compound and antimony compound; and a polyester resin can be obtained having excellent transparency and hue, and low acetaldehyde content as compared with the case wherein the antimony compound is used as a polycondensation catalyst.

The invention claimed is:

1. A polyester resin of which the polymerizability parameter satisfies the following formula (A-1), the stability parameter satisfies the following formula (B-1), and the metal content parameter further satisfies the following formula (C-1):

$$V_{ssp} \geq 0.025 (dl/g \cdot h) \tag{A-1}$$

wherein $V_{ssp}$ is calculated from the intrinsic viscosity of polyester resin, and the intrinsic viscosity of polyester resin after solid polycondensation of this polyester resin at 220° C. under nitrogen atmosphere for any hours between 2 hours and 12 hours, by the following calculation formula:

$$V_{ssp} = ([IV]_1 - [IV]_0)/T$$

wherein $[IV]_0$ and $[IV]_1$ represent intrinsic viscosities (dl/g) before and after the solid polycondensation, respectively, and T represents solid polycondensation time (h);

$$\Delta AA \leq 7.0 \text{ (ppm)} \tag{B-1}$$

wherein ΔAA is calculated from the acetaldehyde amount contained originally in the polyester resin, and the acetaldehyde amount contained in a preform obtained by molding this polyester resin with an injection molding machine at a cylinder temperature of 265 to 275° C. for 26±1 seconds of a molding cycle, by the following calculation formula:

$$\Delta AA = [AA]_1 - [AA]_0$$

wherein $[AA]_0$ and $[AA]_1$ represent acetaldehyde contents (ppm by weight) before and after the molding, respectively;

$$M \leq 50 \text{ (ppm)} \tag{C-1}$$

wherein M represents the total amount (ppm by weight) of the metal atoms contained in the polyester resin.

2. The polyester resin as described in claim 1, wherein the polycondensation time further satisfies the following formula (A-2):

$$T \leq 8 \text{ (h)} \tag{A-2}$$

wherein T represents solid polycondensation time (h) required for elevating the molecular weight of the polyester resin to attain an intrinsic viscosity of 0.84 dl/g by carrying out solid polycondensation of the polyester resin having an intrinsic viscosity of 0.64 dl/g at 220° C. under nitrogen atmosphere.

3. The polyester resin as described in claim 1 or 2, wherein the metal content parameter further satisfies the following formula (C-2):

$$HM \leq 2 \text{ (ppm)} \tag{C-2}$$

wherein HM represents the total amount (ppm by weight) of the heavy metal atoms contained in the polyester resin.

4. A catalyst for polyester production comprising:

(a) a solid titanium-containing compound which comprises titanium, oxygen, carbon, and hydrogen, wherein said solid titanium-containing compound has a Ti—O—C bond, a weight ratio of the titanium atom to carbon atom (Ti/C) is in the range of 50 to 1, and the maximum solubility in ethylene glycol when dissolved in the ethylene glycol at 150° C. is 1,000 ppm or more in terms of converted titanium atom, and (b) an alkali metal compound, wherein the molar ratio of the alkali metal atoms to the titanium atom in the catalyst being in the range of 20/1 to 0.1/1.

5. The catalyst for polyester production as described in claim 4, wherein the solid titanium-containing compound (a) further contains alkali metal in addition to titanium, oxygen, carbon and hydrogen.

6. A catalyst for polyester production comprising: a solid titanium-containing compound which comprises titanium, oxygen, carbon, hydrogen, and alkali metal, wherein said solid titanium-containing compound has a Ti—O—C bond, a weight ratio of the titanium atom to carbon atom (Ti/C) is in the range of 50 to 1, and the maximum solubility in ethylene glycol when dissolved in the ethylene glycol under heating at 150° C. is 1,000 ppm or more in terms of converted titanium atom, and the molar ratio of the alkali metal atoms to the titanium atom being in the range of 20/1 to 0.1/1.

7. The catalyst for polyester production as described in any one of claims 4 to 6, wherein the titanium atom content in the solid titanium-containing compound (a) is 5 to 50% by weight and the carbon atom content is 1 to 35% by weight.

8. The catalyst for polyester production as described in claim 4 or 6, wherein the solid titanium-containing compound (a) contains at least one kind of element selected from the group consisting of beryllium, magnesium, calcium, strontium, barium, scandium, yttrium, lanthanum, zirconium, hafnium, vanadium, niobium, tantalum, chrome, molybdenum, tungsten, manganese, iron, ruthenium, cobalt, rhodium, nickel, palladium, copper, zinc, boron, aluminum, gallium, silicon, germanium, tin, antimony and phosphorus in addition to titanium, oxygen, carbon, hydrogen and alkali metal.

9. The catalyst for polyester production as described in claim 4 or 6 wherein the solid titanium-containing compound (a) is a product of contact between hydrolysate of titanium halide or hydrolysate of titanium alkoxide, and polyol.

10. A catalyst for polyester production comprising
(I) the catalyst for polyester production as described in claim 4 or 6, and
(II) a compound of at least one kind of element selected from the group consisting of beryllium, magnesium, calcium, strontium, barium, boron, aluminum, gallium, manganese, cobalt, zinc, germanium, antimony and phosphorus.

11. The catalyst for polyester production as described in claim 4 or 6, wherein the solid titanium-containing compound (a) is a titanium-containing solution in which the solid titanium-containing compound (a) is dissolved in ethylene glycol-containing solution (c) in an amount of 500 to 100,000 ppm in terms of converted titanium atom.

12. The catalyst for polyester production as described in claim 11, wherein the titanium-containing solution is obtained by adding the alkali metal compound (b) when the solid titanium-containing compound (a) is dissolved in the ethylene glycol-containing solution (c).

13. The catalyst for polyester production as described in claim 11 wherein the titanium-containing solution contains a solubilizing aid in the range of 1 to 50% by weight of, relative to the ethylene glycol-containing solution (c).

14. The catalyst for polyester production as described in claim 13 wherein the solubilizing aid is glycerin or trimethylol propane.

15. The catalyst for polyester production as described in claim 13 wherein the water content of the titanium-containing solution is in the range of 0.05 to 15.0% by weight.

16. The catalyst for polyester production as described in claim 4 or 6 substantially comprising no antimony compound and germanium compound.

17. A method for producing a polyester resin wherein aromatic dicarboxylic acid or an ester-forming derivative thereof and aliphatic diol or an ester-forming derivative thereof are subjected to polycondensation to produce the polyester resin under presence of the catalyst for polyester production as described in claim 4 or 6.

18. A polyester resin prepared by polycondensation of aromatic dicarboxylic acid or an ester-forming derivative thereof and aliphatic diol or an ester-forming derivative thereof under presence of the catalyst for polyester production as described in claim 4 or 6.

19. A polyester resin as described in claim 18, made by solid polycondensation having an intrinsic viscosity of 0.60 dl/g or more.

20. A hollow molded container comprising the polyester resin as described in claim 18.

\* \* \* \* \*